(12) United States Patent
Godwin et al.

(10) Patent No.: US 8,972,475 B2
(45) Date of Patent: *Mar. 3, 2015

(54) NETWORK SECURE COMMUNICATIONS IN A CLUSTER COMPUTING ENVIRONMENT

(75) Inventors: James Russell Godwin, Raleigh, NC (US); David Anthony Herr, Apex, NC (US); Linwood H. Overby, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1105 days.

This patent is subject to a terminal disclaimer.

(21) Appl. No.: 11/962,551

(22) Filed: Dec. 21, 2007

(65) Prior Publication Data

US 2008/0098126 A1    Apr. 24, 2008

Related U.S. Application Data

(63) Continuation of application No. 09/764,252, filed on Jan. 17, 2001, now Pat. No. 7,340,530.

(51) Int. Cl.
| | | |
|---|---|---|
| G06F 15/16 | (2006.01) | |
| G06F 15/173 | (2006.01) | |
| H04L 29/06 | (2006.01) | |
| H04L 29/08 | (2006.01) | |

(52) U.S. Cl.
CPC .......... H04L 63/0272 (2013.01); H04L 63/102 (2013.01); H04L 63/16 (2013.01); H04L 63/20 (2013.01); H04L 67/1002 (2013.01)
USPC ................. 709/201; 709/238; 726/12; 726/15

(58) Field of Classification Search
CPC .............. H04L 63/16–63/168; H04L 63/0272; H04L 67/1002–67/1038
USPC ............... 709/201–203, 238–244; 726/11–15
See application file for complete search history.

(56) References Cited

U.S. PATENT DOCUMENTS

| | | |
|---|---|---|
| 4,403,286 A | 9/1983 | Fry et al. |
| 4,495,570 A | 1/1985 | Kitajima et al. |
| 4,577,272 A | 3/1986 | Ballew et al. |
| 5,031,089 A | 7/1991 | Liu et al. |
| 5,148,433 A | 9/1992 | Johnson et al. |
| 5,652,908 A | 7/1997 | Douglas et al. |
| 5,675,739 A | 10/1997 | Eilert et al. |

(Continued)

OTHER PUBLICATIONS

A. Dahlin, et al, Eddy, A Robust and Scalable Internet Server, Ericsson Telecom AB, Stockholm, Sweden (May 1998).

(Continued)

Primary Examiner — Patrice Winder
Assistant Examiner — Julian Chang
(74) Attorney, Agent, or Firm — Stevens & Showalter, LLP

(57) ABSTRACT

Secure communications are provided over a network in a distributed workload environment having target hosts which are accessed through a distribution processor by a common network address. Secure communications are provided by routing both inbound and outbound communications with target hosts which are associated with a secure network communication through the distribution processor. Both inbound and outbound secure network communications are processed at the distribution processor so as to provide network security processing of communications from the target host and network security processing of communications to the target host.

10 Claims, 18 Drawing Sheets

(56) References Cited

U.S. PATENT DOCUMENTS

| | | |
|---|---|---|
| 5,754,856 A | 5/1998 | Klein |
| 5,774,660 A | 6/1998 | Brendel et al. |
| 5,917,997 A | 6/1999 | Bell et al. |
| 5,923,854 A | 7/1999 | Bell et al. |
| 5,935,215 A | 8/1999 | Bell et al. |
| 5,951,650 A | 9/1999 | Bell et al. |
| 5,968,185 A | 10/1999 | Bressoud et al. |
| 6,104,716 A | 8/2000 | Crichton et al. |
| 6,145,094 A | 11/2000 | Shirriff et al. |
| 6,202,169 B1 | 3/2001 | Razzaghe-Ashrafi et al. |
| 6,266,335 B1 | 7/2001 | Bhaskaran |
| 6,430,622 B1 | 8/2002 | Aiken, Jr. et al. |
| 6,594,709 B1 | 7/2003 | Agasaveeran et al. |
| 6,609,213 B1 | 8/2003 | Nguyen et al. |
| 6,658,018 B1 | 12/2003 | Tran et al. |
| 6,658,081 B2 | 12/2003 | Bruder et al. |
| 6,754,707 B2 | 6/2004 | Richards et al. |
| 6,779,051 B1 | 8/2004 | Basil et al. |
| 6,788,692 B1 * | 9/2004 | Borden et al. ............... 370/400 |
| 6,822,957 B1 | 11/2004 | Schuster et al. |
| 6,826,599 B1 | 11/2004 | Shaffer et al. |
| 6,941,384 B1 | 9/2005 | Aiken, Jr. et al. |
| 6,996,617 B1 | 2/2006 | Aiken, Jr. et al. |
| 6,996,631 B1 | 2/2006 | Aiken, Jr. et al. |
| 7,107,350 B2 | 9/2006 | Godwin et al. |
| 7,734,789 B2 * | 6/2010 | Calhoun ..................... 709/227 |
| 2002/0007415 A1 * | 1/2002 | Douglis et al. ............... 709/230 |
| 2002/0016926 A1 | 2/2002 | Nguyen et al. |
| 2002/0087694 A1 | 7/2002 | Daoud et al. |
| 2002/0112087 A1 * | 8/2002 | Berg ......................... 709/313 |
| 2002/0133608 A1 | 9/2002 | Godwin et al. |

OTHER PUBLICATIONS

Brochure. entitled, ACEdirector™ 8-Port 10/100 MBPS Ethernet Switch, Alteon WebSystems, San Jose, CA (1999).

\* cited by examiner

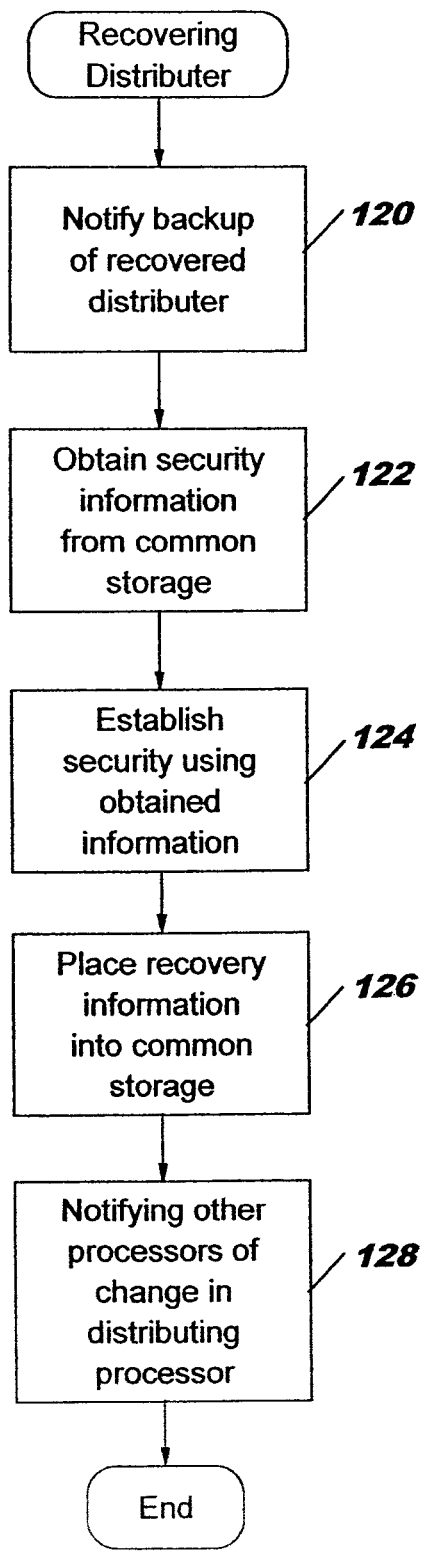

NETWORK SECURE COMMUNICATIONS IN A CLUSTER COMPUTING ENVIRONMENT

CROSS REFERENCE TO RELATED APPLICATIONS

The present application is a continuation of U.S. patent application Ser. No. 09/764,252 entitled METHODS FOR PROVIDING DATA FROM NETWORK SECURE COMMUNICATIONS IN A CLUSTER COMPUTING ENVIRONMENT, which is related to commonly assigned and concurrently filed U.S. Pat. No. 6,941,366 entitled "METHODS, SYSTEMS AND COMPUTER PROGRAM PRODUCTS FOR TRANSFERRING SECURITY PROCESSING BETWEEN PROCESSORS IN A CLUSTER COMPUTING ENVIRONMENT" and U.S. Pat. No. 7,146,432 entitled "METHODS, SYSTEMS AND COMPUTER PROGRAM PRODUCTS FOR PROVIDING FAILURE RECOVERY OF NETWORK SECURE COMMUNICATIONS IN A CLUSTER COMPUTING ENVIRONMENT" the disclosures of which are incorporated by reference as if set forth fully herein.

FIELD OF THE INVENTION

The present invention relates to network communications and more particularly to network communications to a cluster of data processing systems.

BACKGROUND OF THE INVENTION

The Internet Protocol (IP) is a connectionless protocol. IP packets are routed from an originator through a network of routers to the destination. All physical adapter devices in such a network, including those for client and server hosts, are identified by an IP Address which is unique within the network. One valuable feature of IP is that a failure of an intermediate router node or adapter will not prevent a packet from moving from source to destination, as long as there is an alternate path through the network.

In Transmission Control Protocol/Internet Protocol (TCP/IP), TCP sets up a connection between two endpoints, identified by the respective IP addresses and a port number on each. Unlike failures of an adapter in an intermediate node, if one of the endpoint adapters (or the link leading to it) fails, all connections through that adapter fail, and must be reestablished. If the failure is on a client workstation host, only the relatively few client connections are disrupted, and usually only one person is inconvenienced. However, an adapter failure on a server means that hundreds or thousands of connections may be disrupted. On a System/390 with large capacity, the number may run to tens of thousands.

To alleviate this situation, International Business Machines Corporation introduced the concept of a Virtual IP Address, or VIPA, on its TCP/IP for OS/390 V2R5 (and added to VR4 as well). Examples of VIPAs and their user may be found in U.S. Pat. Nos. 5,917,997, 5,923,854, 5,935,215 and 5,951,650. A VIPA is configured the same as a normal IP address for a physical adapter, except that it is not associated with any particular device. To an attached router, the TCP/IP stack on System/390 simply looks like another router. When the TCP/IP stack receives a packet destined for one of its VIPAs, the inbound IP function of the TCP/IP stack notes that the IP address of the packet is in the TCP/IP stack's Home list of IP addresses and forwards the packet up the TCP/IP stack. The "home list" of a TCP/IP stack is the list of IP addresses which are "owned" by the TCP/IP stack. Assuming the TCP/IP stack has multiple adapters or paths to it (including a Cross Coupling Facility (XCF) path from other TCP/IP stacks in a Sysplex), if a particular physical adapter fails, the attached routing network will route VIPA-targeted packets to the TCP/IP stack via an alternate route. The VIPA may, thus, be thought of as an address to the stack, and not to any particular adapter.

While the use of VIPAs may remove hardware and associated transmission media as a single point of failure for large numbers of connections, the connectivity of a server can still be lost through a failure of a single stack or an MVS image. The VIPA Configuration manual for System/390 tells the customer how to configure the VIPA(s) for a failed stack on another stack, but this is a manual process. Substantial down time of a failed MVS image or TCP/IP stack may still result until operator intervention to manually reconfigure the TCP/IP stacks in a Sysplex to route around the failed TCP/IP stack or MVS image.

While merely restarting an application with a new IP address may resolve many failures, applications use IP addresses in different ways and, therefore, such a solution may be inappropriate. The first time a client resolves a name in its local domain, the local Dynamic Name Server (DNS) will query back through the DNS hierarchy to get to the authoritative server. For a Sysplex, the authoritative server should be DNS/Workload Manager (WLM). DNS/WLM will consider relative workloads among the nodes supporting the requested application, and will return the IP address for the most appropriate available server. IP addresses for servers that are not available will not be returned. The Time to Live of the returned IP address will be zero, so that the next resolution query (on failure of the original server, for example) will go all the way back to the DNS/WLM that has the knowledge to return the IP address of an available server.

However, in practice, things do not always work as described above. For example, some clients are configured to a specific IP address, thus requiring human intervention to go to another server. However, the person using the client may not have the knowledge to reconfigure the client for a new IP address. Additionally, some clients ignore the Time to Live, and cache the IP address as long as the client is active. Human intervention may again be required to recycle the client to obtain a new IP address. Also, DNSs are often deployed as a hierarchy to reduce network traffic, and DNSs may cache the IP address beyond the stated Time to Live even when the client behaves quite correctly. Thus, even if the client requests a new IP address, the client may receive the cached address from the DNS. Finally, some users may prefer to configure DNS/WLM to send a Time to Live that is greater than zero, in an attempt to limit network-wide traffic to resolve names. Problems arising from these various scenarios may be reduced if the IP address with which the client communicates does not change. However, as described above, to affect such a movement of VIPAs between TCP/IP stacks requires operator intervention and may result in lengthy down times for the applications associated with the VIPA.

Previous approaches to increased availability focused on providing spare hardware. The High-Availability Coupled Multi-Processor (HACMP) design allows for taking over the MAC address of a failing adapter on a shared medium (LAN). This works both for a failing adapter (failover to a spare adapter on the same node) or for a failing node (failover to another node via spare adapter or adapters on the takeover node.) Spare adapters are not used for IP traffic, but they are used to exchange heartbeats among cluster nodes for failure detection. All of the work on a failing node goes to a single surviving node. In addition to spare adapters and access to the same application data, the designated failover node must also have sufficient spare processing capacity to handle the entire failing node workload with "acceptable" service characteristics (response and throughput).

Automatic restart of failing applications also provides faster recovery of a failing application or node. This may be acceptable when the application can be restarted in place, but is less useful when the application is moved to another node, unless the IP address known to the clients can be moved with the application, or dynamic DNS updates with alternate IP addresses can be propagated to a DNS local to clients sufficiently quickly.

Other attempts at error recovery have included the EDDIE system described in a paper titled "EDDIE, A Robust and Scalable Internet Server" by A. Dahlin, M. Froberg, J. Grebeno, J. Walerud, and P. Winroth, of Ericsson Telecom AB, Stockholm, Sweden, May 1998. In the EDDIE approach, a distributed application called "IP Address Migration Application" controls all IP addresses in the cluster. The cluster is connected via a shared-medium LAN. IP address aliasing is used to provide addresses to individual applications over a single adapter, and these aliases are located via the Address Resolution Protocol (ARP) and ARP caches in the TCP/IPs. The application monitors all server applications and hardware, and reallocates aliased IP addresses, in the event of failure, to surviving adapters and nodes. This approach allows applications of a failing node to be distributed among surviving nodes, but it may require the monitoring application to have complete knowledge of the application and network adapter topology in the cluster. In this sense, it is similar to existing Systems Management applications such as those provided by International Business Machines Corporation's Tivoli® network management software, but the IP Address Migration Application has direct access to adapters and ARP caches. The application also requires a dedicated IP address for inter-application communication and coordination.

U.S. patent application Ser. No. 09/401,419 entitled "METHODS, SYSTEMS AND COMPUTER PROGRAM PRODUCTS FOR AUTOMATED MOVEMENT OF IP ADDRESSES WITHIN A CLUSTER" filed Sep. 22, 1999, the disclosure of which is incorporated herein by reference as if set forth fully herein, describes dynamic virtual IP addresses (VIPA) and their use. As described in the '419 application, a dynamic VIPA may be automatically moved from protocol stack to protocol stack in a predefined manner to overcome failures of a particular protocol stack (i.e. VIPA takeover). Such a predefined movement may provide a predefined backup protocol stack for a particular VIPA. VIPA takeover was made available by International Business Machines Corporation (IBM), Armonk, N.Y., in System/390 V2R8 which had a general availability date of September, 1999.

In addition to failure scenarios, scalability and load balancing are also issues which have received considerable attention in light of the expansion of the Internet. For example, it may be desirable to have multiple servers servicing customers. The workload of such servers may be balanced by providing a single network visible IP address which is mapped to multiple servers.

Such a mapping process may be achieved by, for example, network address translation (NAT) facilities, dispatcher systems and IBM's Dynamic Name Server/Workload Management DNS/WLM systems. These various mechanisms for allowing multiple servers to share a single IP address are illustrated in FIGS. 1 through 3.

FIG. 1 illustrates a conventional network address translation system as described above. In the system of FIG. 1, a client 10 communicates over a network 12 to a network address translation system 14. The network address translation system receives the communications from the client 10 and converts the communications from the addressing scheme of the network 12 to the addressing scheme of the network 12' and sends the messages to the servers 16. A server 16 may be selected from multiple servers 16 at connect time and may be on any host, one or more hops away. All inbound and outbound traffic flows through the NAT system 14.

FIG. 2 illustrates a conventional DNS/WLM system as described above. As mentioned above, the server 16 is selected at name resolution time when the client 10 resolves the name for the destination server from DNS/WLM system 17 which is connected to the servers 16 through the coupling facility 19 and to the network 12. As described above, the DNS/WLM system of FIG. 2 relies on the client 10 adhering to the zero time to live.

FIG. 3 illustrates a conventional dispatcher system. As seen in FIG. 3, the client 10 communicates over the network 12 with a dispatcher system 18 to establish a connection. The dispatcher routes inbound packets to the servers 16 and outbound packets are sent over network 12' but may flow over any available path to the client 10. The servers 16 are typically on a directly connected network to the dispatcher 18 and a server 16 is selected at connect time.

Such a dispatcher system is illustrated by the Interactive Network Dispatcher function of the IBM 2216 and AIX platforms. In these systems, the same IP address that the Network Dispatcher node 18 advertises to the routing network 12 is activated on server nodes 16 as a loopback addresses. The node performing the distribution function connects to the endpoint stack via a single hop connection because normal routing protocols typically cannot be used to get a connection request from the endpoint to the distributing node if the endpoint uses the same IP address as the distributing node advertises. Network Dispatcher uses an application on the server to query a workload management function (such as WLM of System/390), and collects this information at intervals, e.g. 30 seconds or so. Applications running on the Network Dispatcher node can also issue "null" queries to selected application server instances as a means of determining server instance health.

In addition to the above described systems, Cisco Systems offers a Multi-Node Load Balancing function on certain of its routers that perform the distribution function. Such operations appear similar to those of the IBM 2216.

In addition to the system described above, AceDirector from Alteon provides a virtual IP address and performs network address translation to a real address of a selected server application. AceDirector appears to observe connection request turnaround times and rejection as a mechanism for determining server load capabilities.

A still further consideration which has arisen as a result of increased use of the Internet is security. Recently, the Internet has seen an increase in use of Virtual Private Networks which utilize the Internet as a communications media but impose security protocols onto the Internet to provide secure communications between network hosts. Typically, these security protocols are intended to provide "end-to-end" security in that secure communications are provided for the entire communications path between two host processing systems. However, Internet security protocols, which are typically intended to provide "end-to-end" security between a source IP address and a destination IP address, may present difficulties for load balancing and failure recovery.

As an example, the Internet Protocol Security Architecture (IPSec), is a Virtual Private Network (VPN) technology that operates on the network layer (layer 3) in conjunction with an Internet Key Exchange (IKE) protocol component that operates at the application layer (layer 5 or higher). IPSec uses symmetric keys to secure traffic between peers. These symmetric keys are generated and distributed by the IKE function. IPSec uses security associations (SAs) to provide security services to traffic. SAs are unidirectional logical connections between two IPSec systems which may be uniquely identified by the triplet of <Security Parameter Index, IP Destination Address, Security Protocol>. To provide bidirectional communications, two SAs are defined, one in each direction.

SAs are managed by IPSec systems maintaining two databases; a Security Policy Database (SPD) and a Security Associations Database (SAD). The SPD specifies what security services are to be offered to the IP traffic. Typically, the SPD contains an ordered list of policy entries which are separate for inbound and outbound traffic. These policies may specify, for example, that some traffic must not go through IPSec processing, some traffic must be discarded and some traffic must be IPSec processed.

The SAD contains parameter information about each SA. Such parameters may include the security protocol algorithms and keys for Authentication Header (AH) or Encapsulating Security Payload (ESP) security protocols, sequence numbers, protocol mode and SA lifetime. For outbound processing, an SPD entry points to an entry in the SAD. In other words, the SPD determines which SA is to be used for a given packet. For inbound processing, the SAD is consulted to determine how the packet is processed.

As described above, IPSec provides for two types of security protocols, Authentication Header (AH) and Encapsulating Security Payload (ESP). AH provides origin authentication for an IP datagram by incorporating an AH header which includes authentication information. ESP encrypts the payload of an IP packet using shared secret keys. A single SA may be either AH or ESP but not both. However, multiple SAs may be provided with differing protocols. For example, two SAs could be established to provide both AH and ESP protocols for communications between two hosts.

IPSec also supports two modes of SAs; transport mode and tunnel mode. In transport mode, an IPSec header is inserted into the IP header of the IP datagram. In the case of ESP, a trailer and optional ESP authentication data are appended to the end of the original payload. In tunnel mode, a new IP datagram is constructed and the original IP datagram is made the payload of the new IP datagram. IPSec in transport mode is then applied to the new IP datagram. Tunnel mode is typically used when either end of a SA is a gateway.

SAs are negotiated between the two endpoints of the SA and may, typically, be established through prior negotiations or dynamically. IKE may be utilized to negotiate a SA utilizing a two phase negotiation. In phase 1, an Internet Security Association and Key Management Protocol (ISAKMP) security association is established. It is assumed that a secure channel does not exist and, therefore, one is established to protect the ISAKMP messages. This security association in owned by ISAKMP. During phase 1, the partners exchange proposals for the ISAKMP security association and agree on one. The partners then exchange information for generating a shared master secret. Both parties then generate keying material and shared secrets before exchanging additional authentication information.

In phase 2, subsequent security associations for other services are negotiated. The ISAKMP security association is used to negotiate the subsequent SAs. In phase 2, the partners exchange proposals for protocol SAs and agree on one. To generate keys, both parties use the keying material from phase 1 and may, optionally, perform additional exchanges. Multiple phase 2 exchanges may be provided under the same phase 1 protection.

Once phase 1 and phase 2 exchanges have successfully completed, the peers have reached a state where they can start to protect traffic with IPSec according to applicable policies and traffic profiles. The peers would then have agreed on a proposal to authenticate each other and to protect future IKE exchanges, exchanged enough secret and random information to create keying material for later key generation, mutually authenticated the exchange, agreed on a proposal to authenticate and protect data traffic with IPSec, exchanged further information to generate keys for IPSec protocols, confirmed the exchange and generated all necessary keys.

With IPSec in place, for host systems sending outbound packets, the SPD is consulted to determine if IPSec processing is required or if other processing or discarding of the packet is to be performed. If IPSec is required, the SAD is searched for an existing SA for which the packet matches the profile. If no SA is found, a new IKE negotiation is started that results in the desired SA being established. If an SA is found or after negotiation of an SA, IPSec is applied to the packet as defined by the SA and the packet is delivered.

For packets inbound to a host system, if IPSec is required, the SAD is searched for an existing security parameter index to match the security parameter index of the inbound packet. If no match is found the packet is discarded. If a match is found, IPSec is applied to the packet as required by the SA and the SPD is consulted to determine if IPSec or other processing is required. Finally, the payload is delivered to the local process.

In light of the above discussion, various of the workload distribution methods described above may have compatibility problems with IPSec.

SUMMARY OF THE INVENTION

Systems and computer program products according to embodiments of the present invention provide secure communications over a network in a distributed workload environment having target hosts which are accessed through a distribution processor by a common network address. Secure communications are provided by routing both inbound and outbound communications with target hosts which are associated with a secure network communication through the distribution processor. Both inbound and outbound secure network communications are processed at the distribution processor so as to provide network security processing of communications from the target host and network security processing of communications to the target host.

In particular embodiments of the present invention, network communications directed to the common network address are received at the distribution processor. The received network communications are distributed to selected ones of the target hosts so as to distribute workload associated with the network communications.

In further embodiments of the present invention, it may be determined if the received network communications are secure network communications which are to be distributed to ones of the target hosts. If so, processing both inbound and outbound secure network communications at the distribution processor may include processing the received network communications so as to provide generic communications to the ones of the plurality of target hosts. Furthermore, communications from the ones of the target hosts which are associated with secure network communications may be received at the distribution processor. The received communications from the ones of the target hosts are processed so as to provide network security for the communications from the ones of the target hosts.

In particular embodiments, the communications received from the target hosts and the generic communications to ones of the plurality of target hosts may be encapsulated in a generic routing format. Furthermore, the generic communications may be encapsulated in a generic routing format having sufficient information in a header of the generic routing format so as to authenticate the source of the communication between the distributing processor and ones of the plurality of target hosts.

In still additional embodiments of the present invention, the communications received from the target hosts and the generic communications to ones of the plurality of target hosts are communicated over trusted communication links.

In further embodiments, common IP filters are established for communications encapsulated in the generic routing format at the distributing processor and the plurality of target hosts. The common IP filters may bypass IP filtering for inbound communications encapsulated in the generic routing format and associated with secure network communications.

In still further embodiments of the present invention, Internet Protocol Security (IPSec) communications are provided from a network to a plurality of application instances executing on a cluster of data processing systems utilizing a virtual Internet Protocol Address (VIPA) Distributor to provide a routing communication protocol stack which distributes connections to at least one dynamically routable VIPA (DVIPA) to a plurality of target communication protocol stacks. IPSec communications are provided by receiving inbound IPSec communications from the network at the routing communication protocol stack and performing IPSec processing of the received inbound IPSec communications at the routing communication protocol stack to provide non-IPSec communications to a first target communication protocol stack associated with the received inbound IPSec communications. Outbound non-IPSec communications from a second target communication protocol stack are also received at the routing communication protocol stack and IPSec processing performed on the received outbound non-IPSec communications at the routing communication protocol stack to provide outbound IPSec communications to the network corresponding to the received outbound non-IPSec communications.

In particular embodiments of the present invention, the target communication protocol stacks send outbound communications associated with a connection utilizing IPSec which is routed through the routing communication protocol stack to the routing communication protocol stack for IPSec processing. The target communication protocol may determine if an outbound communication associated with a connection utilizing IPSec is routed through the routing communication protocol stack. If so, non-IPSec communications for the connection utilizing IPSec are directed to the routing communication protocol stack. The target communication protocol stack may perform IPSec processing of the communications if the connection utilizing IPSec is not routed through the routing communication protocol stack.

In particular embodiments of the present invention, the routing communication protocol stack and the plurality of target communication protocol stacks communicate utilizing a trusted communication link. Furthermore, the cluster of data processing systems may be a Sysplex and the trusted communication link may be a cross coupling facility of the Sysplex.

In further embodiments of the present invention, the routing communication protocol stack encapsulates the IPSec processed received IPSec communications in a generic routing encapsulation (GRE) formatted communication and sends the GRE formatted communication to the first target communication protocol stack over a trusted communication link. In such embodiments, receiving outbound non-IPSec communications from a second target communication protocol stack at the routing communication protocol stack includes receiving a GRE encapsulated communication from the second target communication protocol stack. Similarly IPSec processing of the received outbound non-IPSec communications at the routing communication protocol stack to provide outbound IPSec communications to the network corresponding to the received outbound non-IPSec communications may be provided by extracting a non-IPSec communication from the received GRE encapsulated communication and IPSec processing the extracted non-IPSec communication.

Additionally, common IP filters for GRE encapsulated communications may be established at the routing communication protocol stack and the target communication protocol stacks. The common IP filters may bypass IP filtering for inbound GRE encapsulated communications associated with IPSec communications.

In particular embodiments of the present invention, the cluster of data processing systems is a Sysplex and the routing communication protocol stack and the target communication protocol stacks communicate utilizing a cross coupling facility (XCF) of the Sysplex. Furthermore, the GRE encapsulated communications include an XCF source address and an XCF destination address in an outer GRE header. In such embodiments, an IP address of a physical link over which a GRE encapsulated communication was received and an IP address contained in the GRE encapsulated communication may be evaluated to determine if the received GRE encapsulated communication was received over an XCF link. The received GRE encapsulated communication may be discarded if the received GRE encapsulated communication was not received over an XCF link.

As will further be appreciated by those of skill in the art, the present invention may be embodied as methods, apparatus/systems and/or computer program products.

BRIEF DESCRIPTION OF THE DRAWINGS

FIG. 8A is a flowchart illustrating operations of a primary distributing processor upon recovery from a failure according to embodiments of the present invention;

DETAILED DESCRIPTION OF THE INVENTION

Figure 1:
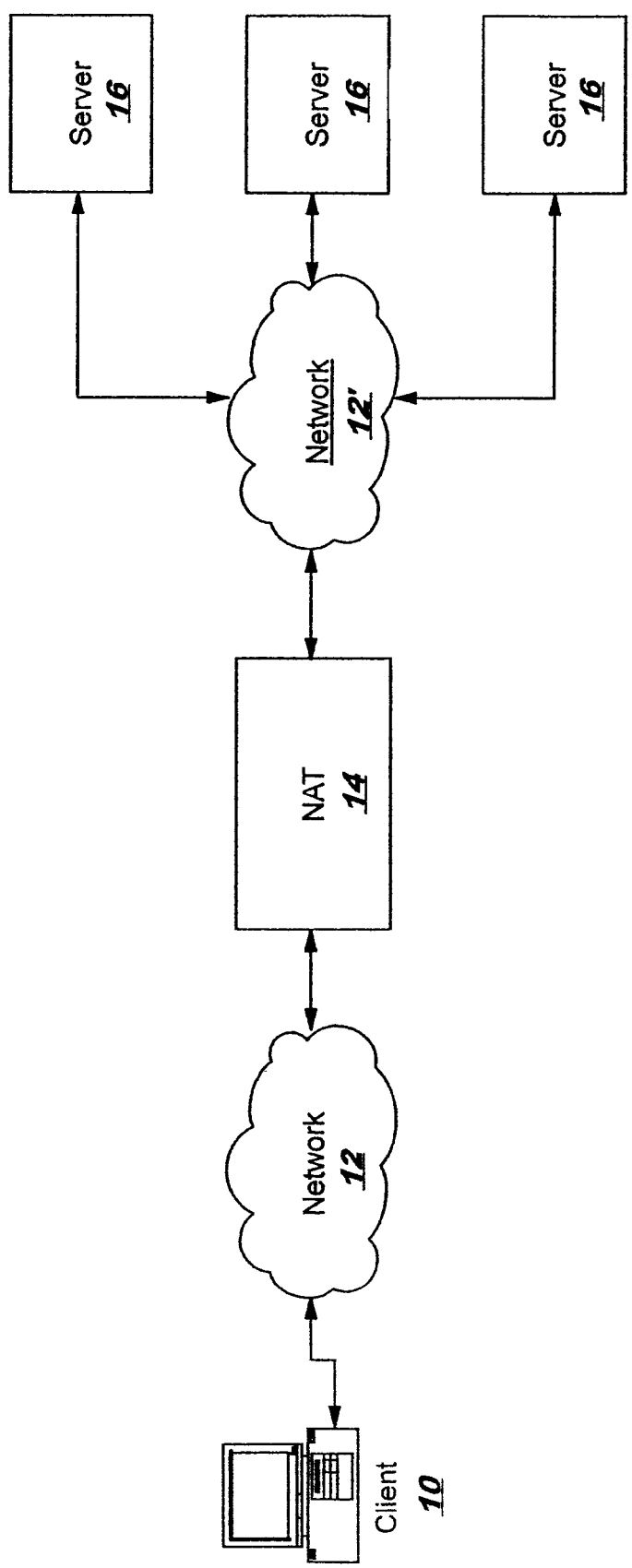
FIG. 1 is block diagram of a conventional network address translation system.
Figure 2:
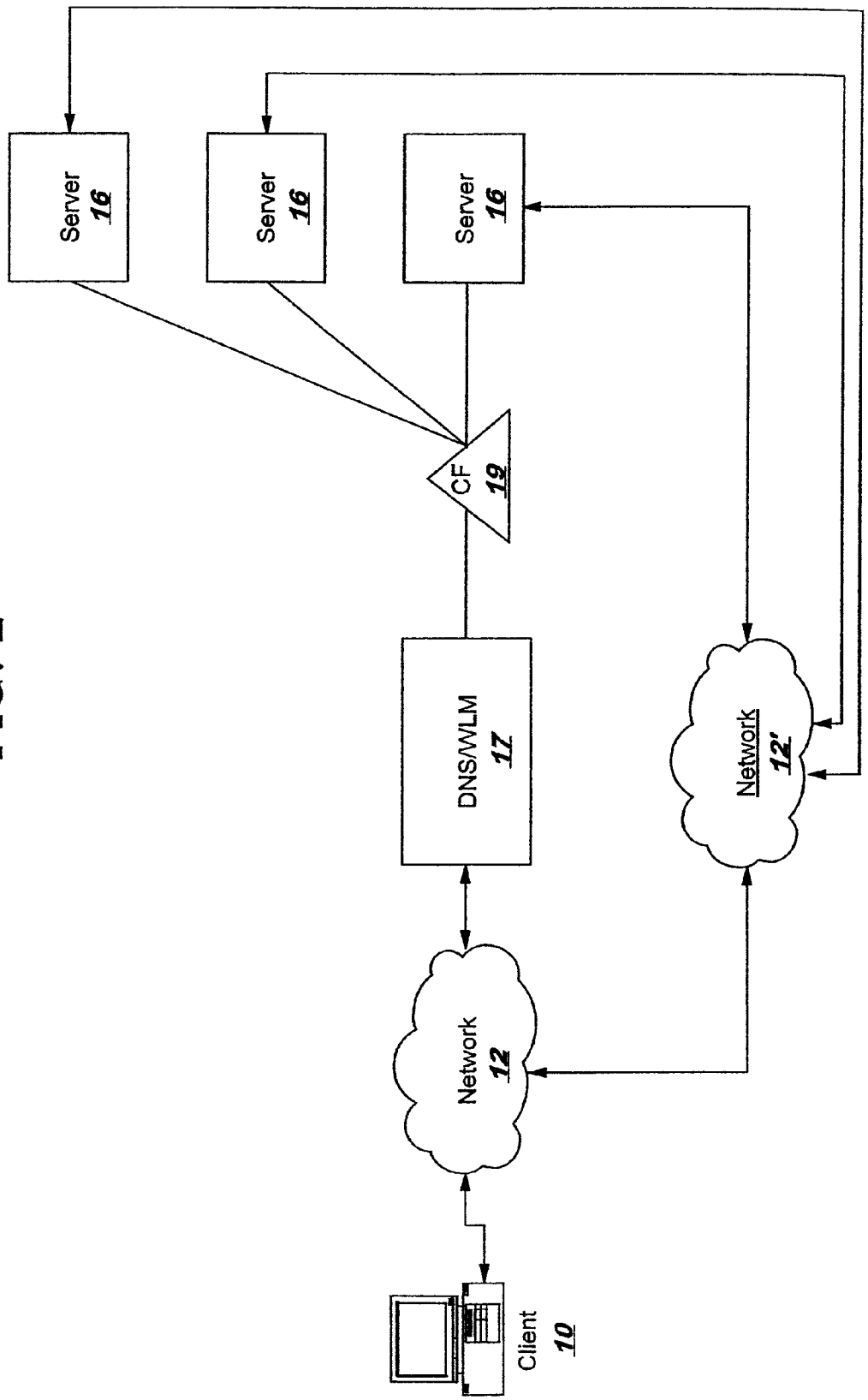
FIG. 2 is block diagram of a conventional DNS/WLM system.
Figure 3:
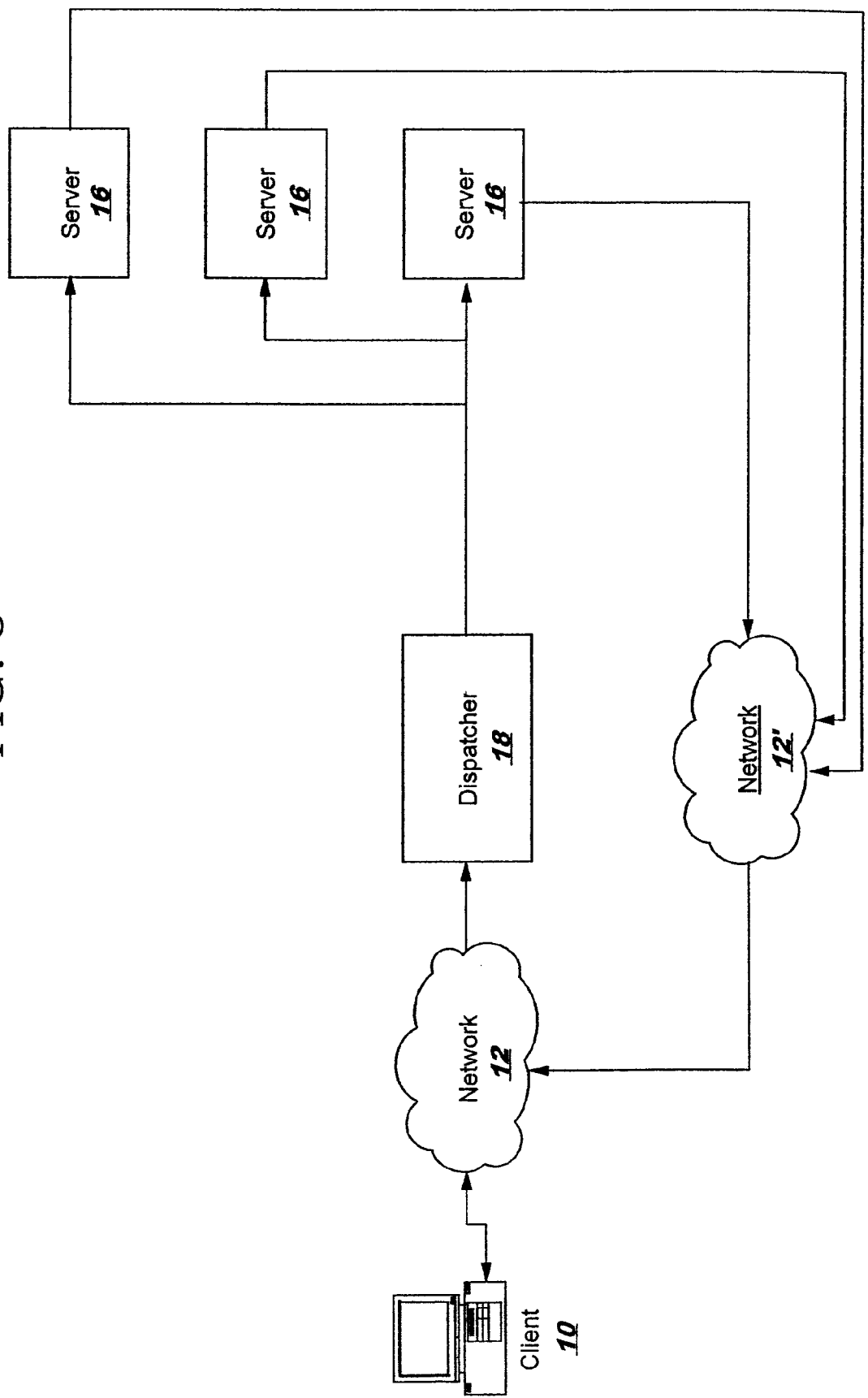
FIG. 3 is block diagram of a conventional dispatcher system.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a removable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

The present invention can be embodied as systems, methods, or computer program products which allow for end-to-end network security to be provided in a cluster of data processing systems which utilize a common IP address and have workload utilizing the common IP address distributed to data processing systems in the cluster. Such secure network communications may be provided by forcing all communications which are secure network communications through a distributing processor in the cluster of data processing systems and performing all security processing at the distributing processor. Thus, inbound and outbound communications utilizing the common IP address would be routed through the distributing processor which would perform security processing for the cluster of data processing systems.

Embodiments of the present invention will now be described with reference to FIGS. 4 through 15 which are flowchart and block diagram illustrations of operations of protocol stacks incorporating embodiments of the present invention. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart and/or block diagram block or blocks. The computer program instructions may be executed by a processor to cause a series of operational steps to be performed by the processor to produce a computer implemented process such that the instructions which execute on the processor provide steps for implementing the functions specified in the flowchart and/or block diagram block or blocks.

Accordingly, blocks of the flowchart illustrations and/or block diagrams support combinations of means for performing the specified functions, combinations of steps for performing the specified functions and program instruction means for performing the specified functions. It will also be understood that each block of the flowchart illustrations and/or block diagrams, and combinations of blocks in the flowchart illustrations and/or block diagrams, can be implemented by special purpose hardware-based systems which perform the specified functions or steps, or combinations of special purpose hardware and computer instructions.

Figure 4:
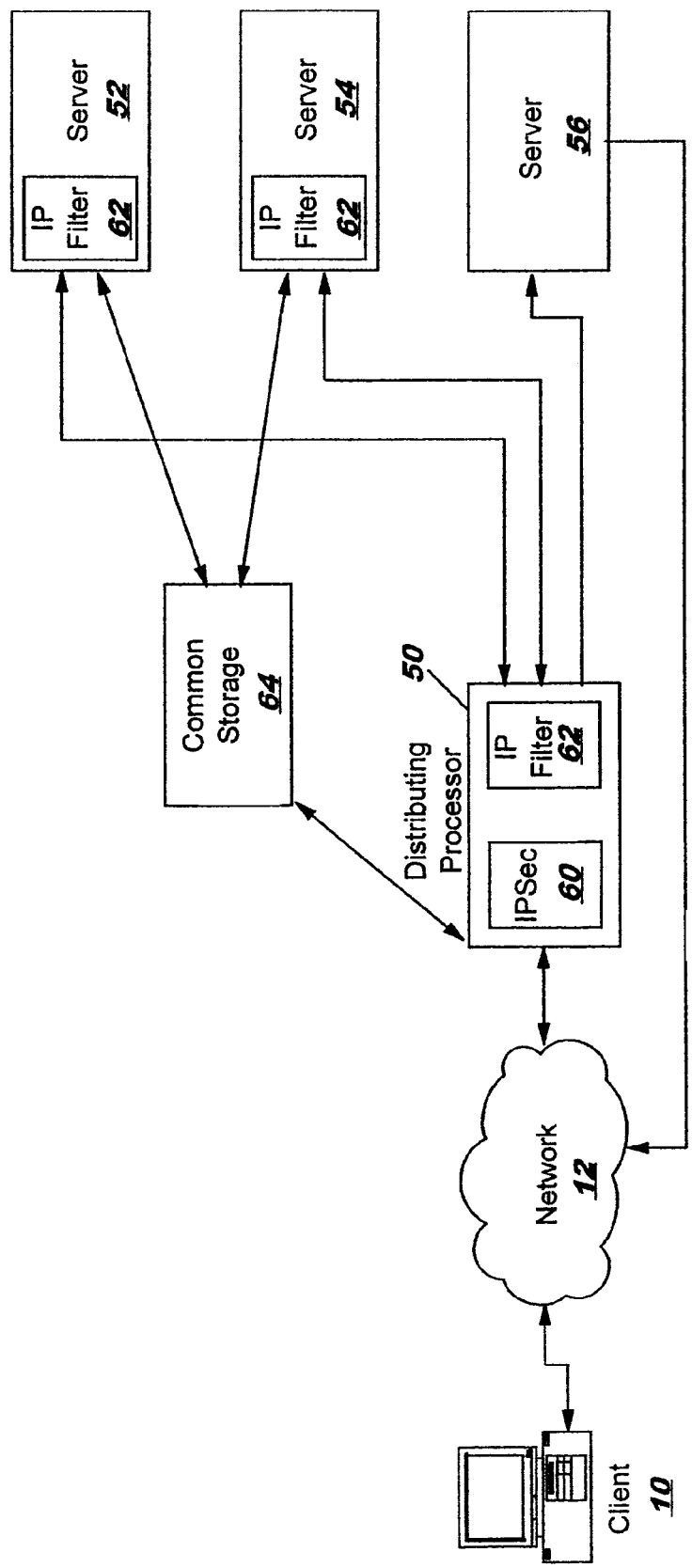
FIG. 4 is block diagram of a cluster of data processing systems incorporating embodiments of the present invention.

FIG. 4 illustrates an environment in which embodiments of the present invention may be utilized. As seen in FIG. 4, the client 10 communicates with the network 12 to communicate with a distributing processor 50. The distributing processor 50 may perform workload management and may distribute connections to a single IP address to one of the servers 52, 54 or 56 such that the client 10 may communicate with any of the servers 52, 54 or 56 utilizing the single IP address as a destination address. The distributing processor 50 may also function as a server and, thus, be the ultimate endpoint of communications with the client 10. Furthermore, as illustrated in FIG. 4, the distributing processor 50 may also provide for routing of secure network communications utilizing the single IP address between the servers 52, 54 and 56 and the network 12. The servers 52, 54 and 56 and the distributing processor 50 may be data processing systems in a cluster of data processing systems.

In operation, when the distributing processor 50 receives communications from the client 10 to the single IP address, the distributing processor 50 routes these communications to appropriate ones of the servers 52, 54 or 56. Outbound communications from the servers 52, 54 or 56 need not be routed through the distributing processor 50, however, if the communications are secure network communications, the distributing processor 50 provides security processing for both inbound and outbound communications. For example, a connection utilizing the single IP address which does not utilize network security, such as a connection to the server 56, may have inbound communications routed through the distributing processor 50 and to the server 56 while outbound communications 51 are routed from the server 56 to the network 12 without passing through the distributing processor 50.

As briefly mentioned above, for connections utilizing network security, the distributing processor 50 performs network security processing for both inbound and outbound communications. Thus, as seen in FIG. 4, the connections to the servers 52 and 54 which utilize network security are routed through the distributing processor 50 for both inbound and outbound communications. The communications between the servers 52 and 54 and the distributing processor 50 need not utilize a network security protocol as they would be routed over a trusted communications link. Network security based on a network security protocol is applied to the outbound communications and removed from the inbound communications by the distributing processor 50. Thus, the distributing processor 50 is illustrated as having a network security function, such as the IPSec function 60 illustrated in FIG. 4, which may provide network security processing, such as IPSec processing, for inbound and outbound communications with the network 12 even though the communications are originated by or distributed to the servers 52 and 54. The IPSec function 60 may include, for example, a communication protocol stack supporting IPSec and an IKE application. Other security protocols may also be utilized while still benefitting from the teachings of the present invention.

As mentioned above, the communications between the distributing processor 50 and the servers 52 and 54 are communicated over a trusted communication link and, therefore, need not use the network security. Such a trusted communication link may be provided, for example, by the interconnections between the data processing systems when co-located in a physically secure environment, a logically secure environment or both. For example, a physically secure environment may be provided by a local area network in a secure building. A logically secure environment may be provided by, for example, the cross coupling facility (XCF) in an OS/390 Sysplex such that the communications between the distributing processor 50 and the servers 52 and 54 are provided using XCF links. As will be appreciated by those of skill in the art, the XCF links may be logically secure or both logically and physically secure. Similarly, encryption could also be provided for communications between data processing systems in the cluster such that the communications could be transmitted over a non-secure transmission media. As will be appreciated by those of skill in the art in light of the present disclosure, other trusted mechanisms for communications within the cluster of data processing systems may also be utilized.

Returning to FIG. 4, the distributing processor 50 may also provide IP filtering for communications with the network 12. Similarly, the distributing processor 50 and the servers 52 and 54 may provide IP filtering for communications between each other. Thus, the servers 52 and 54 and the distributing processor 50 are illustrated as incorporating an IP filter function 62. The IP filter policies may be the same on each of the servers 52 and 54 which may simplify configuration of data processing systems in the cluster of data processing systems. Furthermore, in particular embodiments, the IP filtering may also be the same for the distributing processor 50.

To facilitate use of consistent IP filtering policies within the cluster, it is preferred that inbound IP filtering be bypassed for communications within the cluster of distributed traffic associated with an external connection employing network security. Also, outbound filtering may be bypassed for distributed traffic from the network. Such a selective bypass of IP filtering may be provided by the communications between the distributing processor 50 and the servers 52 which are associated with communications on the network 12 utilizing a network security protocol being encapsulated into, for example, a generic routing format. Consistent policies could then be provided which bypass IP filtering for such encapsulated communications. Normal IP filter could then be applied to other communications. Accordingly, existing IP filtering externals need not be changed and a consistent policy may be provided for all processing systems in the cluster of data processing systems.

FIG. 4 also illustrates a common storage 64 which may be utilized in error recovery situations. In such error conditions, another data processing system in the cluster may be designated as a backup distributing processor. For example, the server 52 or the server 54 may be designated as a backup distributing processor. The primary distributing processor 50 would place network security protocol information in the common storage 64 so as to allow a backup distributing processor to access this information in the event of failure. The information would be sufficient to allow the backup distributing processor to take over network security processing for the communications on the network 12. For example, if the network security protocol is IPSec, Phase 1 SA and/or Phase SA information about each of the IPSec SAs could be stored in the common storage 64.

In the event of failure of the distributing processor 50, the backup distributing processor, for example the server 52, would access the common storage 64 and take over the routing and security processing of the communications utilizing the security protocol which were being handled by the primary distributing processor 50. The backup distributing processor would also place information in the common storage 64 from which the communications utilizing the network security protocol could be established at another data processing system in the cluster. In the event that the primary distributing processor 50 recovers from the failure, the primary distributing processor 50 may take back handling the routing and security processing. Such a recovery may be accomplished by notifying the backup distributing processor of the primary distributing processor 50 recovery and utilizing the information in the common storage 64 to move the communications utilizing the security protocol back to the primary distributing processor 50.

As will be appreciated by those of skill in the art, while the common storage 64 may be utilized to share information which may allow movement of security protocol processing within a cluster of data processing systems, other such information sharing techniques may also be utilized. For example, information could be broadcast or otherwise transmitted to backup distributing processors by the primary distributing processor and the information maintained at each potential backup. Similarly, the backup distributing processors could broadcast or otherwise transmit the information to a recovering primary distributing processor upon notification of the recovery of the primary distributing processor. Accordingly, other mechanisms for sharing information to provide backup and failure recovery may be utilized while still benefitting from the teachings of the present invention.

Figure 5A:
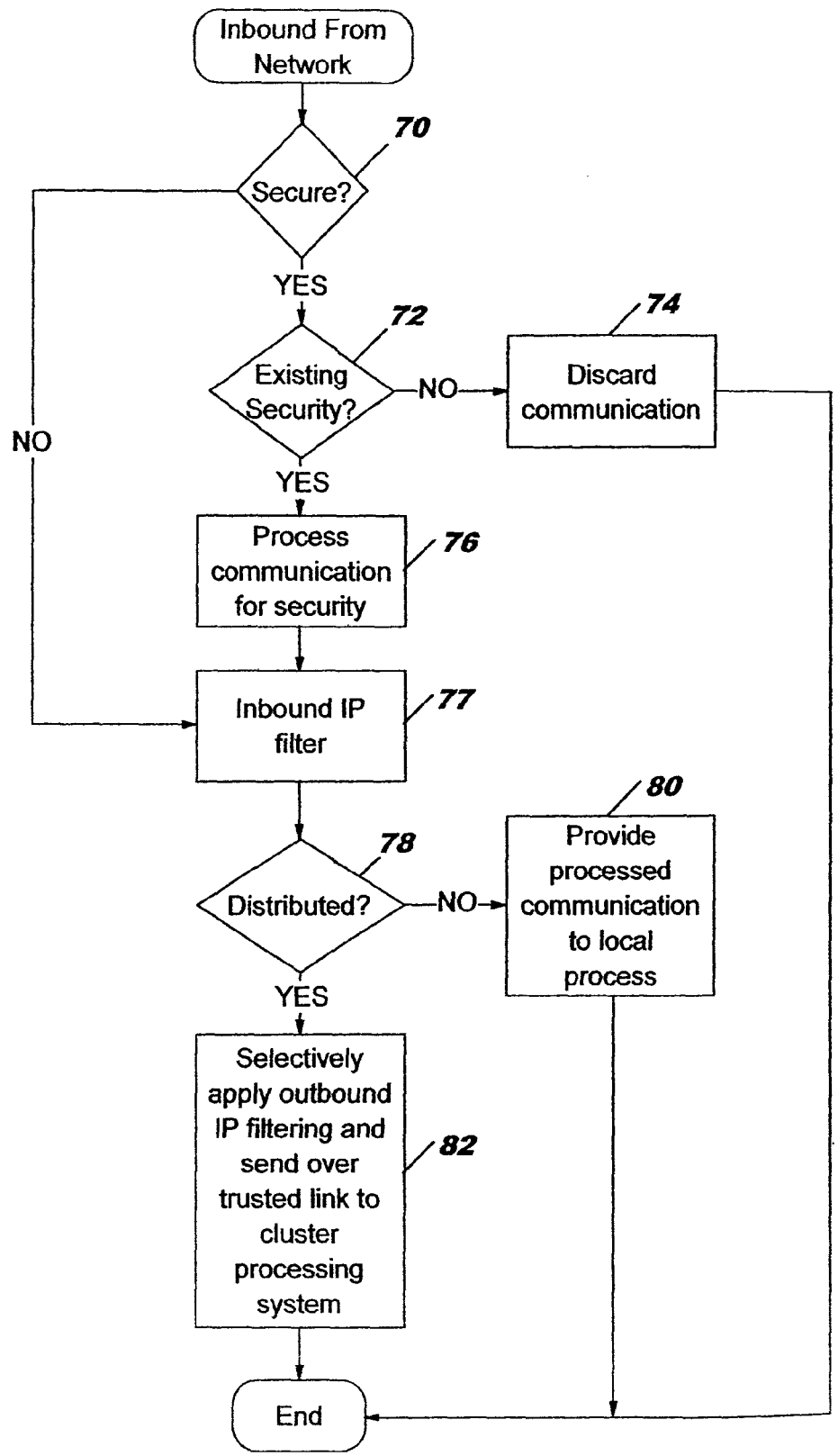
FIG. 5A is flowchart illustrating operations of a distributing processor for inbound secure communications according to embodiments of the present invention.

Operations according to particular embodiments of the present invention will now be described with reference to the flowcharts of FIGS. 5A through 8B. As seen in FIG. 5A, when the distributing processor 50 receives a communication from the network 12, the distributing processor 50 may determine if the communication is a secure communication (block 70). If the communication is not a secure communication, then no security processing need be done on the communication and it may be processed normally by applying the inbound IP filters (block 77) and, if distributed (block 78), selectively applying outbound IP filters to the communication and sending it over the communication link to its destination within the cluster of data processing systems (block 82). If not distributed, the inbound IP filters may be applied (block 77) and the information provided to the local process (block 80). For example, a communication which is not using a network security protocol may be received by the distributing processor 50 and provided to the server 56.

If, however, the communication is a secure communication (block 70), the distributing processor 50 determines if the communication is associated with an existing security relationship (block 72). If not, the communication may be discarded (block 74). If a security relationship does exist (block 72), the secure communication is processed based on the security protocol (block 76) and may also be inbound IP filtered (block 77).

In any event, after security processing of the received communication to provide the information of the communication without the security the received communication may also be inbound filtered. If the information is not for a distributed destination (block 78) (i.e. is for a process or service executing locally on the distributing processor 50), the information is provided to the local process (block 80). If the communication is for a destination which is distributed by the distributing processor 50 (block 78), the outbound filtering may be selectively bypassed and the information sent to the destination processing system in the cluster of data processing systems (block 82). Optionally, outbound filtering could be applied to such communications.

Furthermore, in particular embodiments, the information may be encapsulated in a generic routing format prior to distribution within the cluster of data processing systems after block 82. As described above, such an encapsulation may provide for simplified filter policies on the data processing systems as it may allow for the efficient separation of communications associated with secure network communications from other communications.

Figure 5B:
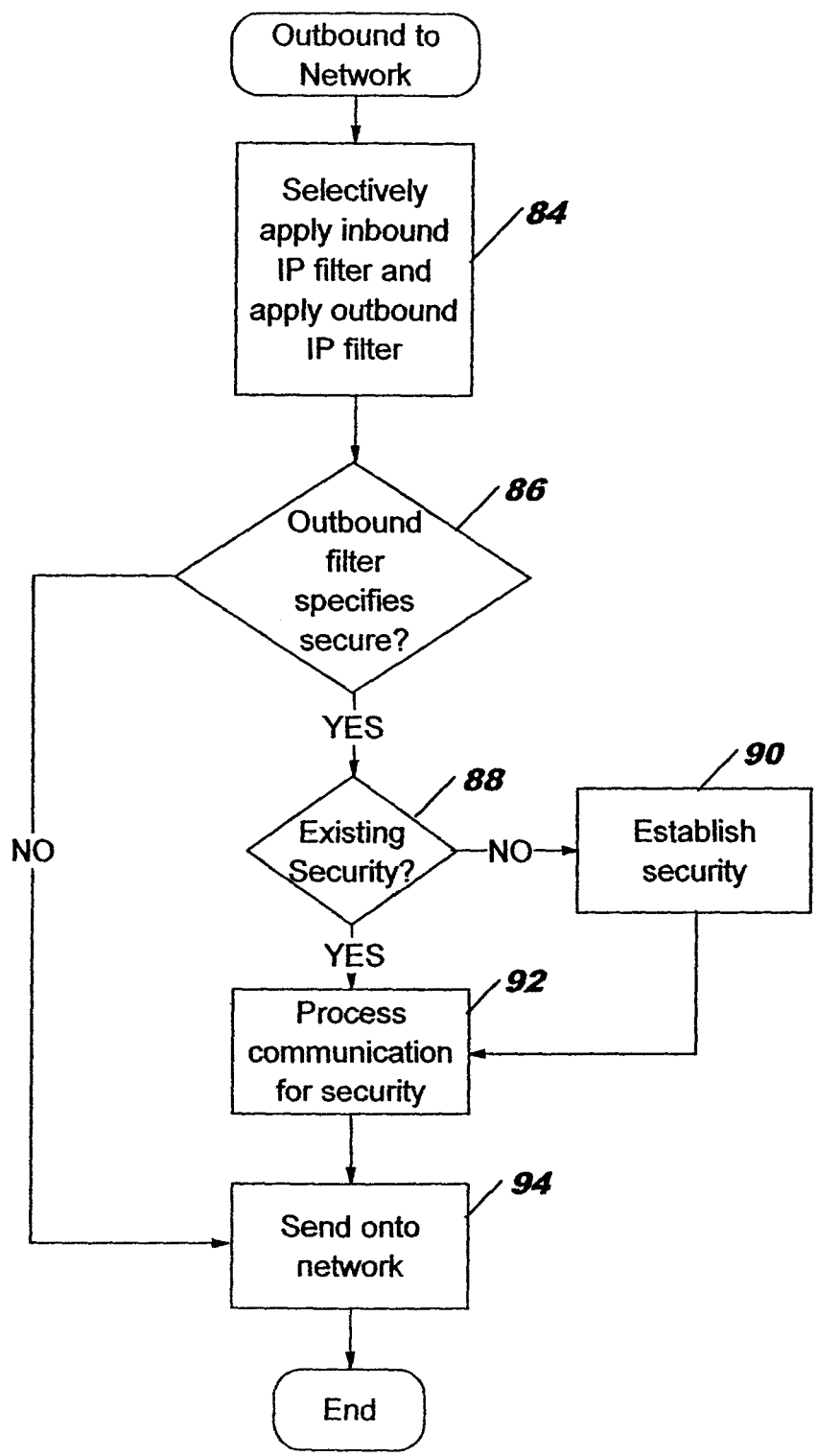
FIG. 5B is a flowchart illustrating operations of a distributing processor for outbound secure communications according to embodiments of the present invention.

FIG. 5B illustrates operations of the distributing processor 50 when a communication is received from another data processing system in the cluster of data processing systems. As seen in FIG. 5B, when the distributing processor 50 receives a communication from within the cluster of data processing systems, the distributing processor 50 may selectively apply its inbound IP filter to the communication and apply the outbound IP filter to the communication (block 84). As described above, the inbound IP filtering is preferably bypassed if the communication is associated with a network communication utilizing a network security protocol. Furthermore, the determination to bypass the inbound IP filtering may be made based on the message being encapsulated in the generic routing format as described above.

In any event, the distributing processor 50 also determines if security is specified for the communication (block 86), for example, by the outbound IP filter specifying security for the communication. Such a determination could also be made by evaluation of the communication or may be based on the encapsulation of the communication in the generic routing format or both. If security is not specified for the communication, then no security processing need be done on the communication and it may be processed normally and sent to the network 12 (block 94). If, however, the communication is associated with a network communication utilizing a network security protocol (block 86), the distributing processor 50 determines if the communication is associated with an existing security relationship (block 88), such as a secure connection. If not, a security relationship may be established (block 90). Such a security relationship may be established dynamically by sending a secure communication or through a request mechanism. As part of the establishing of the security relationship, the distributing processor 50 may store information sufficient to reestablish the security relationship in the common storage 64. Optionally, if a separate communication, such as a NEWCONN message, is used to establish security relationships, the communication could be discarded until the security relationship was established.

After establishing the security relationship, or if the relationship was previously established (block 88), the secure communication is processed based on the security protocol (block 92). Such processing may be optional if a previous security relationship has not been established. For example, in IPSec, the communications may be discarded until a Phase 2 SA was established. In such a case, the security processing of received communications would not commence until a communication was received after the security relationship was established. Such operations could be reflected in FIG. 5B by the output of block 90 being moved to terminate at the END block. In any event, after security processing of the received communication to apply the security protocol to the communication, the information is sent onto the network 12 (block 94).

Figure 6:
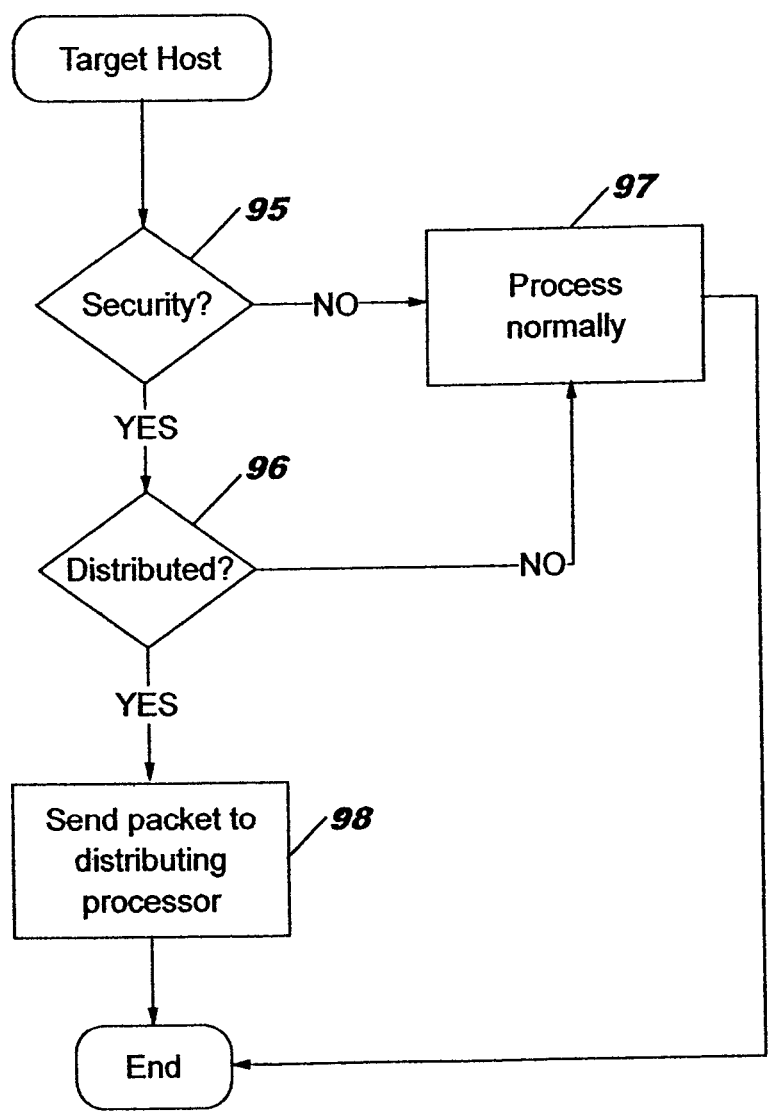
FIG. 6 is a flowchart illustrating operations of a target host according to embodiments of the present invention.

FIG. 6 illustrates operations of a server, such as the servers 52 and 54 in FIG. 4, for sending communications to the network. The server determines if the communication is associated with a network communication utilizing a network security protocol (block 95). If not, then the communication may be processed normally (block 97) by, for example, sending the communication directly to network 12. If, however, the communication is associated with a network communication utilizing a network security protocol (block 95), then it is determined if the communication is for a distributed IP address (block 96). If not, the communication is processed normally (i.e. network security processing is performed locally) (block 97). If the communication is for a distributed IP address, the server sends the communication to the distributing processor 50 for security protocol processing and forwarding to the network 12 (block 98). As described above, such transmission of the communication to the distributing processor 50 may involve encapsulating the communication in a generic routing format and forwarding the encapsulated communication to the distributing processor.

Furthermore, in addition to the operations described above with reference to FIGS. 5A through 6, the distributing processor 50 and the servers 52 and 54 may also evaluate the communications between them to determine the authenticity of the source so as to reduce the likelihood of an unauthorized entity "spoofing" either the distributing processor 50 or the servers 52 and 54. Such an evaluation may, for example, be made by including information in the encapsulated communication such that the physical link over which the communication was received may be compared to the source of the encapsulated communication. If the encapsulated communication is not received from a physical link associated with the source of the encapsulated communication, then the communication could be discarded.

Figure 7A:
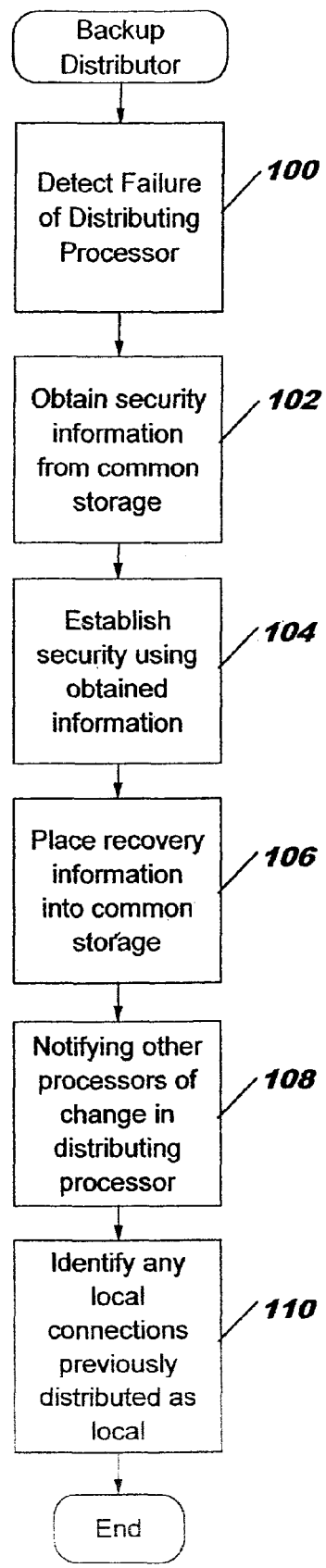
FIG. 7A is a flowchart illustrating operations of a backup distributing processor in response to a failure of a primary distributing processor according to embodiments of the present invention.
Figure 7B:
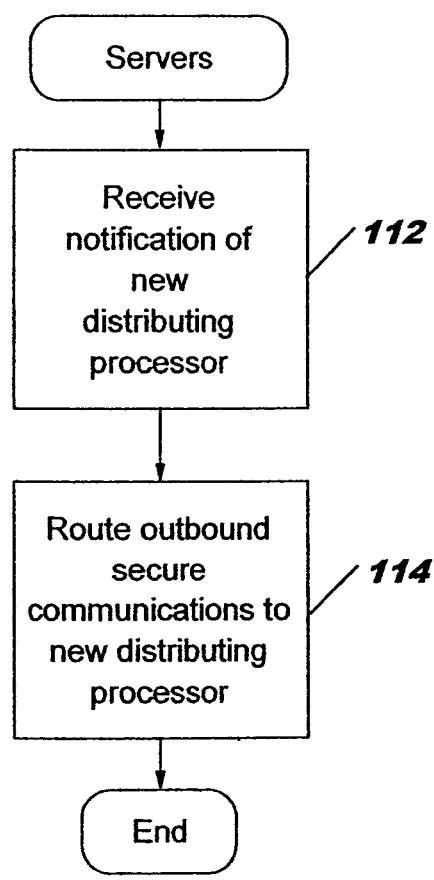
FIG. 7B is a flowchart illustrating operations of a target host in response to a failure of a primary distributing processor according to embodiments of the present invention.

FIGS. 7A and 7B are flowcharts illustrating operations of a backup distributing processor and servers according to embodiments of the present invention incorporating failure recovery. FIG. 7A illustrates operations of the backup distributing processor which may be any processor in the cluster of data processing systems capable of carrying out the security processing and distribution operations of the primary distributing processor 50. As seen in FIG. 7A, the backup distributing processor detects the failure of the primary distributing processor (block 100). Such detection may be provided utilizing various mechanisms including notification of the failure of the primary distributing processor 50, periodic polling, communication traffic monitoring, or the like.

When the failure is detected, the backup distributing processor obtains the security information for communications distributed by the primary distributing processor 50 from the common storage 64 (block 102). The obtained security information is used to establish security relationships to the backup distributing processor (block 104) over the network 12. The information obtained from the common storage 64 may be removed from the common storage 64 after it is obtained by the backup distributing processor, preferably, after the new security relationships are established. The backup distributing processor also places the information for recovery of the newly established security relationships in the common storage 64 (block 106).

The backup distributing processor may also notify other data processing systems in the cluster that it has taken over as the distributing processor (block 108) so that subsequent communications associated with communications on network 12 utilizing a security protocol will be sent to the backup distributing processor. Furthermore, if the backup distributing processor was receiving communications to a distributed IP address, these connections are marked as local to the backup distributing processor (block 110).

FIG. 7B illustrates operations of the servers 52 and 54 when the primary distributing processor 50 fails. As seen in FIG. 7B, the servers 52 and 54 receive notification from the backup distributing processor that it has taken over the previous distributed communications (block 112). The servers 52 and 54 then route outbound secure communications for distributed addresses to the new distributing processor (block 114). Such outbound communications may be processed by the servers 52 and 54 as described above with reference to FIG. 6.

Figure 8B:
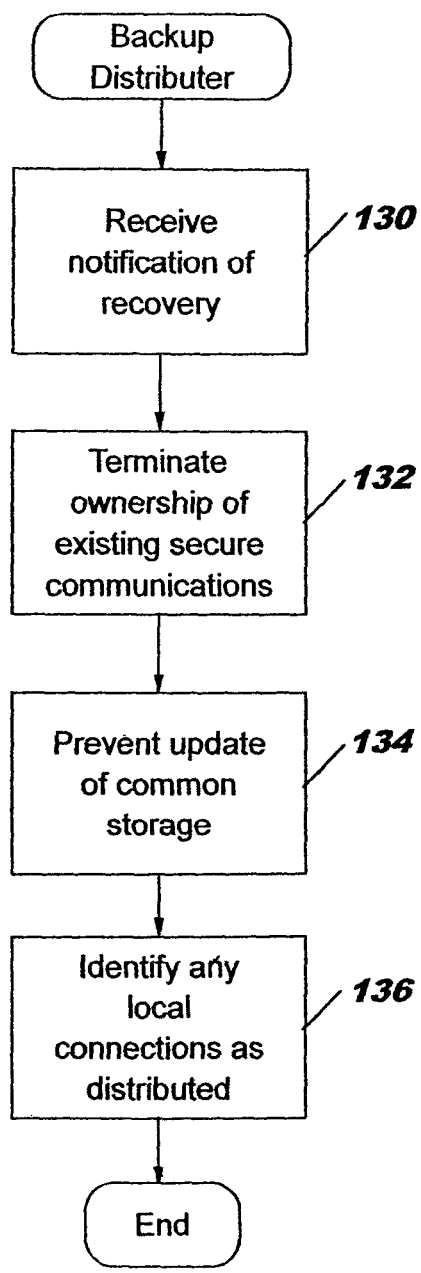
FIG. 8B is a flowchart illustrating operations of a backup distributing processor upon recovery of a primary distributing processor from a failure according to embodiments of the present invention.

FIGS. 8A and 8B describe operations of the backup distributing processor and the primary distributing processor upon recovery of the failed primary distributing processor. As seen in FIG. 8A, when a distributing processor has recovered from a failure, the recovered distributing processor notifies the backup distributing processor that it has recovered (block 120). The recovering distributing processor then obtains the security information from the common storage 64 (block 122). The obtained security information is used to establish security relationships to the recovering distributing processor (block 124) over the network 12. The information obtained from the common storage 64 may be removed from the common storage 64 after it is obtained by the recovering distributing processor, preferably, after the new security relationships have been established. The recovering distributing processor also places the information for recovery of the newly established security relationships in the common storage 64 (block 126). The recovering distributing processor may also notify other data processing systems in the cluster that it has taken over as the distributing processor (block 128) so that subsequent communications associated with communications on network 12 utilizing a security protocol will be sent to the recovering distributing processor.

FIG. 8B illustrates operations of the backup distributing processor when the primary distributing processor recovers from a failure. The backup distributing processor receives the notification of recovery of the primary distributing processor (block 130) and terminates ownership of any existing secure communications (block 132). The backup distributing processor also prevents updates of the common storage 64 with any additional security information (block 134). Furthermore, to the extent that the backup distributing processor had any distributed connections as local, these connections are marked as distributed (block 136). Such distributed connections would then be handled as described above with reference to the servers 52 and 54.

While the present invention is described above with reference to servers, such servers may also be referred to as hosts, target hosts or target data processing systems and represent an endpoint for communications from the network. Similarly, the distributing processor may be a data processing system or other network device capable of carrying out the operations described herein. Furthermore, while embodiments of the present invention are described with reference to a failure and recovery scenario, as will be appreciated by those of skill in the art, operations such as those described herein for movement of a distributing processor may be carried out for other reasons. For example, the primary distributing processor may be taken offline for maintenance, or a new distributing processor may be incorporated into the cluster of data processing systems. Thus, embodiments of the present invention should not be construed as limited to the "failure" scenario as the teachings of the present invention may be applicable to any scenario where the distribution function for an IP address is to be moved.

As described above, through the use of particular embodiments of the present invention, a cluster of data processing systems may appear as a single data processing system to the network for security purposes. As such, end-to-end security may be provided between the cluster of data processing systems and a network accessible device. For network security purposes, the distributing processor provides the endpoint for the cluster of data processing systems, thus allowing the communications to be distributed throughout the cluster without requiring each data processing system to provide network security processing or be individually accessible as endpoints of communications employing the network security protocol.

In particular embodiments of the present invention, IPSec is provided to a Sysplex cluster utilizing Sysplex Distributor. The Sysplex Distributor was provided in OS/390 V2R10 (General Availability of September, 1999) and is described in detail in commonly assigned U.S. patent application Ser. No. 09/640,409, entitled "METHODS, SYSTEMS AND COMPUTER PROGRAM PRODUCTS FOR CLUSTER WORKLOAD DISTRIBUTION", U.S. patent application Ser. No. 09/640,412, entitled "METHODS, SYSTEMS AND COMPUTER PROGRAM PRODUCTS FOR NON-DISRUPTIVELY TRANSFERRING A VIRTUAL INTERNET PROTOCOL ADDRESS BETWEEN COMMUNICATION PROTOCOL STACKS" and U.S. patent application Ser. No. 09/640,438, entitled "METHODS, SYSTEMS AND COMPUTER PROGRAM PRODUCTS FOR FAILURE RECOVERY FOR ROUTED VIRTUAL INTERNET PROTOCOL ADDRESSES", the disclosures of which are incorporated herein by reference as if set forth fully herein. Such systems have previously attempted to provide IPSec support by having the IPSec endpoint be a distributing host and a TCP endpoint be the target hosts. However, such a difference may lead to security complexities and inconsistencies within the Sysplex. Such inconsistencies have lead to OS/390 V2R10 requiring that all IPSec traffic not be distributed, thus depriving IPSec traffic of the benefits of distribution provided by the systems of the above reference patent applications. Embodiments of the present invention may overcome such a limitation.

In Sysplex Distributor, a single IP address is associated with a plurality of communication protocol stacks in a cluster of data processing systems by providing a routing protocol stack which associates a Virtual IP Address (VIPA) and port with other communication protocol stacks in the cluster and routes communications to the VIPA and port to the appropriate communication protocol stack. VIPAs capable of being shared by a number of communication protocol stacks are referred to herein as "dynamic routable VIPAs" (DVIPA). While the present invention is described with reference to a specific embodiment in a System/390 Sysplex, as will be appreciated by those of skill in the art, the present invention may be utilized in other systems where clusters of computers utilize virtual addresses by associating an application or application group rather than a particular communications adapter with the addresses. Thus, the present invention should not be construed as limited to the particular exemplary embodiments described herein.

Figure 9:
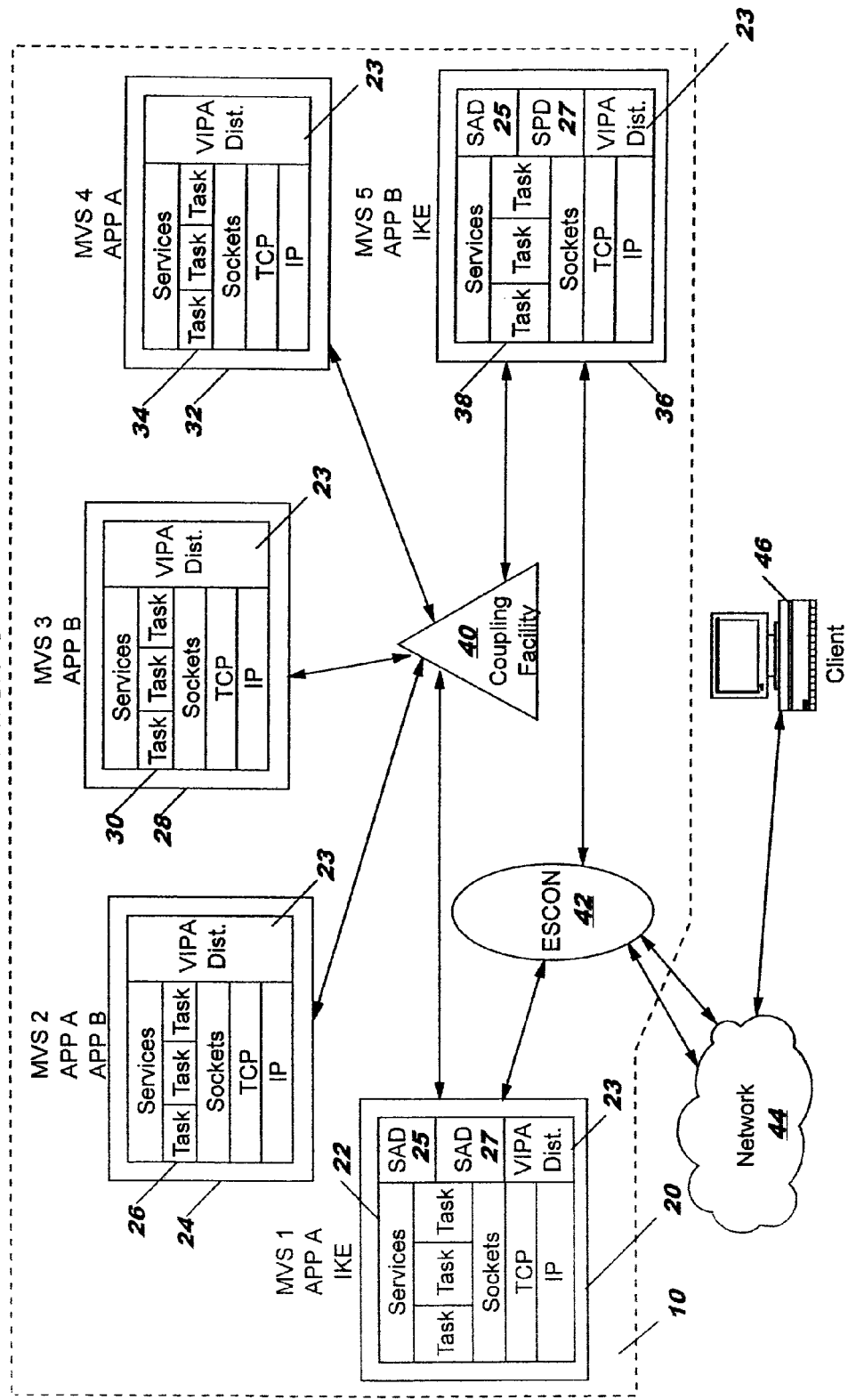
FIG. 9 is a block diagram of a CS/390 Sysplex incorporating Sysplex Distributor incorporating Sysplex Wide Security Associations according to embodiments of the present invention.

A cluster of data processing systems is illustrated in FIG. 9 as a cluster of nodes in Sysplex 10. As seen in FIG. 9, several data processing systems 20, 24, 28, 32 and 36 are interconnected in a Sysplex 10. The data processing systems 20, 24, 28, 32 and 36 illustrated in FIG. 9 may be operating system images, such as MVS images, executing on one or more computer systems. While the present invention will be described primarily with respect to the MVS operating system executing in a System/390 environment, the data processing systems 20, 24, 28, 32 and 36 may be mainframe computers, mid-range computers, servers or other systems capable of supporting dynamic routable Virtual IP Addresses as described herein.

As is further illustrated in FIG. 9, the data processing systems 20, 24, 28, 32 and 36 have associated with them communication protocol stacks 22, 26, 30, 34 and 38, which may be TCP/IP stacks. The communication protocol stacks 22, 26, 30, 34 and 38 have been modified to incorporate a VIPA distribution function 23 as described herein for providing dynamic routable VIPAs so as to provide a single IP address for multiple communication protocol stacks.

While each of the communication protocol stacks 22, 26, 30, 34 and 38 illustrated in FIG. 9 incorporate the VIPA distribution function 23, not all communication protocol stacks in a Sysplex need incorporate the VIPA distribution function 23. Thus, the present invention may be carried out on any system where two or more communication protocol stacks in a cluster of data processing systems support dynamic routable VIPAs. If a communication protocol stack does not support dynamic routable VIPA, then the dynamic routable VIPA messages according to the present invention would be ignored by the communication protocol stack. Thus, the present invention provides backward compatibility with existing communication protocol stacks.

As is further seen in FIG. 9, the communication protocol stacks 22, 26, 30, 34 and 38 may communicate with each other through a coupling facility 40 of the Sysplex 10, for example, utilizing XCF messaging. Furthermore, the communication protocol stacks 22 and 38 may communicate with an external network 44 such as the Internet, an intranet, a Local Area Network (LAN) or Wide Area Network (WAN) utilizing the Enterprise System Connectivity (ESCON) 42. Thus, a client 46 may utilize the network 44 to communicate with an application executing on an MVS image in Sysplex 10 through the communication protocol stacks 22 and 38 which may function as routing protocol stacks as described herein.

As is further illustrated in FIG. 9, as an example of utilization of the present invention and for illustration purposes, data processing system 20 has associated with it communication protocol stack 22 which is associated with MVS image MVS 1 which has application APP A executing on MVS image MVS 1 and utilizing communication protocol stack 22 to allow access to, for example, client 46 through network 44. Furthermore, the communication protocol stack 22 is capable of IPSec processing managing and accessing the SPD 27 and SAD 25. MVS image MVS 1 also has an instance of the IKE application executing to allow negotiation of IPSec SAs. Similarly, data processing system 24 has associated with it communication protocol stack 26 which is associated with MVS image MVS 2 which has a second instance of application APP A and an instance of application APP B executing on MVS image MVS 2 which may utilize communication protocol stack 26 for communications. Data processing system 28 has associated with it communication protocol stack 30 which is associated with MVS image MVS 3 which has a second instance of application APP B executing on MVS image MVS 3 which may utilize communication protocol stack 30 for communications. Data processing system 32 has associated with it communication protocol stack 34 which is associated with MVS image MVS 4 which has a third instance of application APP A executing on MVS image MVS 4 which may utilize communication protocol stack 34 for communications. Finally, data processing system 36 has associated with it communication protocol stack 38 which is associated with MVS image MVS 5 which has a third instance of application APP B executing on MVS image MVS 5 which may utilize communication protocol stack 38 for communications. Furthermore, the communication protocol stack 38 is capable of IPSec processing, managing and accessing the SPD 27 and SAD 25. MVS image MVS 5 also has an instance of the IKE application executing to allow negotiation of IPSec SAs.

Utilizing the above described system configuration as an example, the VIPA distribution function 23 with IPSec support will now be described. The VIPA distribution function 23 allows for protocol stacks which are defined as supporting DVIPAs to share the DVIPA and communicate with network 44 through a routing protocol stack such that all protocol stacks having a server application which is associated with the DVIPA will appear to the network 44 as a single IP address. Such dynamically routable VIPAs may be provided by designating a protocol stack, such as protocol stack 22, as a routing protocol stack, notifying other protocol stacks of the routing protocol stack and having other protocol stacks notify the routing protocol stack when an application which binds to the DVIPA is started. Such routing protocol stacks also provide IPSec processing for the DVIPA and, therefore, operate as distributing processors as described above.

Because communications to the DVIPA are routed through the routing protocol stack, the routing protocol stack may provide work load balancing by distributing connections to the other protocol stacks on MVS images executing server applications which bind to the DVIPA to balance workload while still providing IPSec capabilities for such distributed connections. Furthermore, in particular embodiments of the present invention, scalability and availability may be provided by allowing all protocol stacks for MVS images which execute applications which bind to the DVIPA to have communications routed through the routing protocol stack without user intervention to establish the routing path.

Further aspects of the VIPA distribution function 23 according to embodiments of the present invention allow automated movement of a routing protocol function to a backup stack. Another aspect of the VIPA distribution function 23 allows recovery of a failed routing stack without disruption to connections through the backup stack.

The communication protocol stacks 22, 26, 30, 34 and 38 may be configured as to which stacks are routing stacks, backup routing stacks and server stacks. Different DVIPAs may have different sets of backup stacks, possibly overlapping. The definition of backup stacks may be the same as that for the VIPA takeover function described in U.S. patent application Ser. No. 09/401,419, entitled "METHODS, SYSTEMS AND COMPUTER PROGRAM PRODUCTS FOR AUTOMATED MOVEMENT OF IP ADDRESSES WITHIN A CLUSTER" which is incorporated herein by reference as if set forth fully herein.

In providing for DVIPAs and IPSec, up to five or more aspects of DVIPA operation may be addressed: 1) initialization and definition of DVIPAs and the affected protocol stacks; 2) incoming communications from network 44 to the DVIPA; 3) connections originated by a protocol stack (i.e. outgoing to network 44); 4) failure of a routing stack; and 5) recovery of a routing stack.

Turning now to the first of these aspects, for the present example, application APP A is associated with DVIPA VA1 which may be associated with the respective first, second and third instances of APP A; and application APP B likewise has DVIPA VB1 associated with the respective first, second and third instances of APP B.

Configuration of a dynamic routable VIPA may be provided by a definition block established by a system administrator for each routing communication protocol stack 22 and 38. Such a definition block is described in the above referenced United States patent applications and defines dynamic routable VIPAs for which a communication protocol stack operates as the primary communication protocol stack. Backup protocol stacks may be defined as described of the VIPA takeover procedure. Thus, the definition block "VIPADynamic" may be used to define dynamic routable VIPAs. Within the VIPADynamic block a definition may also be provided for a protocol stack supporting moveable VIPAs. All of the VIPAs in a single VIPADEFine statement should belong to the same subnet, network, or supernet, as determined by the network class and address mask. VIPAs may also be defined as moveable VIPAs which may be transferred from one communication protocol stack to another.

Similarly, within the definitions, a protocol stack may be defined as a backup protocol stack and a rank ((e.g. a number between 1 and 254) provided to determine relative order within the backup chain(s) for the associated dynamic routable VIPA(s). A communication protocol stack with a higher rank will take over the dynamic VIPAs before a communication protocol stack with a lower rank.

Within the VIPADYNamic block, a VIPA may be defined as a dynamic routable VIPA based on a VIPA address and a portlist which is a list of ports for which the DVIPA will apply. Alternatively, all ports for an IP address may be considered as DVIPAs. Also provided in the definition is a list of protocol stacks which will be included as server stacks in routing communications directed to the DVIPA. The IP addresses which define the potential server stacks may be XCF addresses of the protocol stacks or may be designated "ALL." If "ALL" is designated, then all stacks in the Sysplex are candidates for distribution. This may include future stacks which are not active when the routing stack is initialized. Thus, if ALL is specified, a protocol stack may be added to the DVIPA without disruption of operations and without user intervention to redefine the stack in the VIPADynamic block. In addition to the above definitions, a range of IP addresses may be defined as DVIPAs utilizing the VIPARange definition.

The communication protocol stacks 22 and 38, which are designated as routing protocol stacks as they have connections to the network 44, support IPSec processing, have an IKE instance and include VIPADISTribute statements in the VIPADynamic block and publish the distribution information through messages broadcast by the VIPA takeover function 23 of each of the communication protocol stacks 22, 26, 30, 34 and 38 to the other communication protocol stacks 22, 26, 30, 34 and 38. At initialization or profile changes, the communication protocol stacks 22, 26, 30, 34 and 38 communicate to partner communication protocol stacks the complete list of dynamic routable VIPAs, their associated potential servers and list of ports and the primary and backup definitions for the communication protocol stack.

When a communication protocol stack 22, 26, 30, 34 and 38 receives the DVIPA information it notes if it is identified as a candidate target protocol stack or as a backup stack. If the protocol stack is a candidate target stack, it monitors its applications and sends a message to the defined routing stack when an application instance is bound to the DVIPA and listens on a defined port. If the protocol stack is a backup stack, it stores the DVIPA information for use in the event of failure of the primary routing stack.

Returning to the example of FIG. 9, for MVS1 to MVS5, the VIPADEFine statements may be:

MVS1:VIPADEFine MOVEable IMMEDiate DVA1
VIPADISTribute DVA1 PORT 60 DESTIP XCF1, XCF2, XCF4

MVS5:VIPADEFine MOVEable IMMEDiate DVB1
VIPADISTribute DVB1 PORT 60 DESTIP ALL VIPADISTribute DVA1 PORT 60 DESTIP XCF2, XCF3, XCF4

For purposes of illustration, the respective address masks have been omitted because they are, typically, only significant to the routing daemons. In the above illustration, XCF1 is an XCF address of the TCP/IP stack on MVS1, XCF2 is an XCF address of the TCP/IP stack on MVS2 and XCF3 is an XCF address of the TCP/IP stack on MVS4. Note that, for purposes of the present example, definitions for MVS2, MVS3, and MVS4 are not specified. Such may be the case because the protocol stacks for these MVS images are candidate target protocol stacks and are not identified as routing protocol stacks and, therefore, receive their dynamic routable VIPA definitions from the routing protocol stacks. As is further illustrated, the backup routing communication protocol stack may have a separate VIPADISTribute definition for a DVIPA than the primary routing communication protocol stack. As described in more detail below, in such a case, the explicit definition of the VIPADISTribute statement for the backup routing communication protocol stack in the event of failure of the primary routing stack. Additional VIPA definitions may also be provided, however, in the interests of clarity, such definitions have been omitted.

The VIPABackup statements for MVS1 and MVS5 of FIG. 9 may be:

MVS1: VIPABackup 30 DVB1
MVS5: VIPABackup 10 DVA1

Furthermore, IP security policies that effect DVIPA traffic (from an IKE perspective) are replicated on each of MVS image. Similarly, from a protocol stack perspective, policies (i.e. anchor rules) that are applicable to DVIPA traffic are made identical on each MVS image. Additionally, the ordering of the rules should allow for consistent application of security policy on all MVS images.

Figure 10:
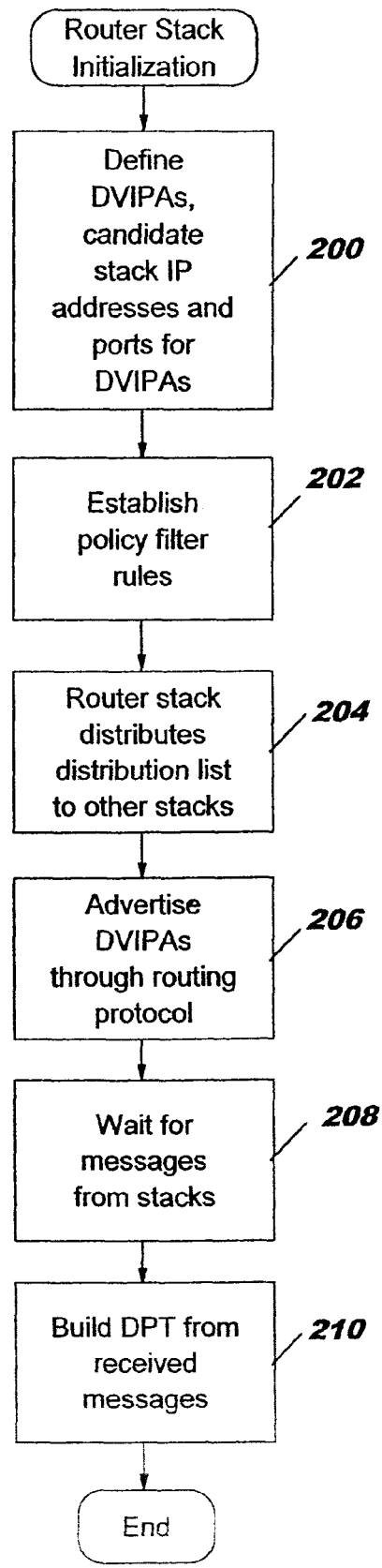
FIG. 10 is a flowchart illustrating operations for initialization of a routing protocol stack incorporating distributable VIPAs and IPSec according to embodiments of the present invention.

FIG. 10 illustrates operations of a routing communication protocol stack, such as the protocol stacks 22 and 38 in FIG. 9 in the present example. As seen in FIG. 10, the dynamic routable VIPA is defined as described above to include the candidate target stack XCF IP addresses and the ports for the DVIPA (block 200). In the present example, the protocol stack 22 has DVIPA DVA1 identified as the dynamic routable VIPA, port 60 is routable and the candidate target stacks are communication protocol stacks corresponding to XCF addresses XCF1, XCF2, and XCF4. The protocol stack 38 has DVIPA DVB1 identified as the dynamic routable VIPA, port 60 is routable and the candidate target stacks are specified by the "ALL" value and may be any stack in the cluster.

Also the policy filter rules are established on each of the routing communication protocol stacks (block 202). The routing communication protocol stack distributes the list of DVIPAs, ports and candidate target stacks to each of the stacks in the cluster (block 204). Such a distribution may be carried out by, for example, broadcasting the information as part of a VIPA_list as is utilized in VIPA takeover. In the present example, communication protocol stacks 22 and 38 would distribute their information to the other communication protocol stacks 22, 26, 30, 34 and 38. The routing communication protocol stacks 22 and 38 also advertise their respective DVIPAs as IP addresses through the routing protocol utilized to communicate with the network 44 (block 206). Alternatively, ownership of the DVIPAs for communications on the network 44 may be established through the IP Assist function of Queued Direct I/O for OSA Express adapters.

The routing communication protocol stacks also wait for messages from the other communication protocol stacks which identify applications which are bound to their DVIPAs and listen on an identified port (block 208). As the messages are received, the routing communication protocol stacks build a Destination Port Table (DPT) which identifies those stacks having instances of applications bound to the DVIPA and listening on an identified port (block 210). Thus, the routing communication protocol stacks, such as the communication protocol stacks 22 and 38, are notified of which communication protocol stacks have applications bound to the DVIPA and which are available to distribute connections to the DVIPA so as to balance workload between the applications.

Initialization and operation of a server stack is described in detail in the above described United States patent applications. Furthermore, in addition to the initialization described in these United States patent applications, the server stack will also install the policy filters as described above. Briefly, the communication protocol stack monitors the addresses and ports associated with application instances utilizing the protocol stack and, if an application utilizing the protocol stack is bound or binds to the DVIPA and listens on a port identified in the VIPA list as a DVIPA port, the protocol stack sends a message to the routing communication protocol stack associated with the DVIPA to notify the routing communication protocol stack that communications may be routed to the application through the candidate target stack. Such candidate target protocol stacks which have applications bound to the DVIPA and listening on a port associated with the DVIPA may be referred to as a "current actual target" and, as described above, are identified in the DPT of the routing communication protocol stack as available for receiving connections.

A message may also be sent if an application instance bound to a DVIPA and listening to a port identified in the VIPA list terminates so that the VIPA distribution function 23 of the routing communication protocol stack may maintain an up-to-date DPT. If there are any active connections to the DVIPA, a connection message may be sent to the routing protocol stack to notify it of the existence of the connection. In such a manner, the routing protocol stack may incorporate the connection in its current routing table (CRT) as described herein. Such a connection message may allow for movement of connections between routing protocol stacks, for example, to recover from a failure of a routing protocol stack.

Because the IPSec processing is performed at the routing protocol stack and not the server protocol stack, previous fragmentation avoidance mechanisms, such as those provided in OS/390 V2R8 which examined IPSec dynamic tunnels to determine IPSec header size and then reduced the Maximum Transmission Unit (MTU) size associated with the connection, for example, in the Transmission Control Block (TCB), is typically not possible. Thus, to avoid fragmentation, the MTU size in the TCB of the server protocol stack is adjusted by a representative IPSec header size, rather than the actual IPSec header size, if IPSec is specified for a connection.

Figure 11:
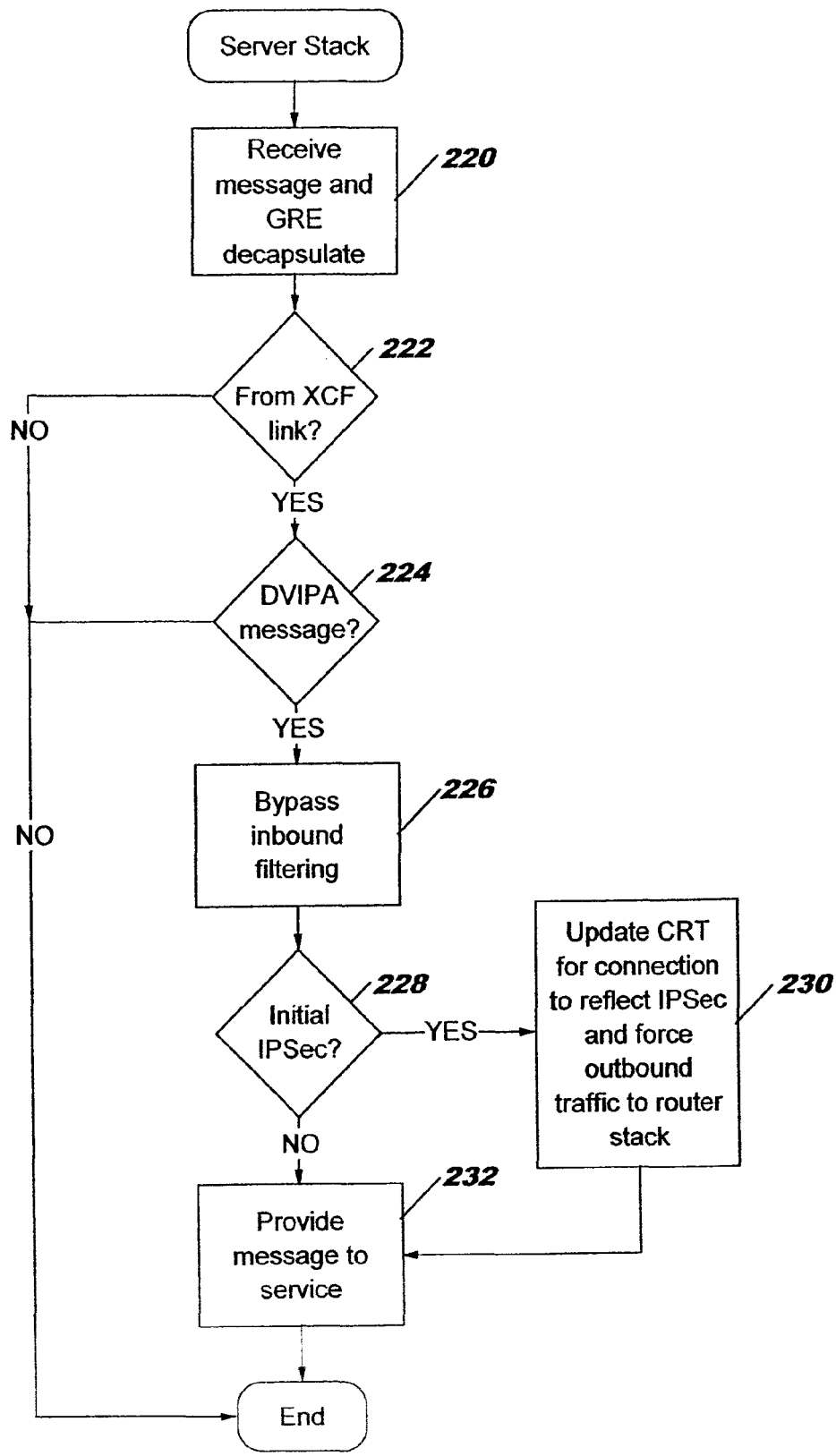
FIG. 11 is a flowchart illustrating operations of a server protocol stack for handling messages associated with IPSec communications according to embodiments of the present invention.

FIG. 11 illustrates operations carried out by a VIPA distribution function 23 of a communication protocol stack upon receiving a GRE encapsulated message from another communication protocol stack which requires IPSec processing. As seen in FIG. 11, when a protocol stack receives a message the message is GRE decapsulated (block 220). The protocol stack determines if the communication was received from a physical link corresponding to the XCF source identified in the GRE header of the message (block 222). If not, then the message is considered a "spoof" of the source and is discarded. If the message is received from the corresponding physical link (block 222), the protocol stack determines if the message is for a DVIPA (block 224). If the message is not for a DVIPA, then normal processing of the message may be performed. If information for a DVIPA using IPSec is present in the message (block 222), then the VIPA distribution function 23 bypasses inbound filtering (block 226) and it is determined if the message is an initial IPSec message for the DVIPA connection (block 228). If it is an initial message, the CRT is updated to reflect that the connection is using IPSec and outbound messages for the DVIPA connection are routed to the routing communication protocol stack (block 230). In any event, the message is provided to the appropriate service (block 232).

In the present example using the system illustrated in FIG. 9, the protocol stack 22 of MVS1 would broadcast a VIPA list (DVIPA_list_1) identifying MVS1 as the primary routing communication protocol stack, DVA1 as a dynamic routable VIPA with port 60 as an associated port and the communication protocol stacks 22, 26 and 34 as candidate target communication protocol stacks. Additionally, the protocol stack

38 of MVS5 would broadcast a VIPA list (DVIPA_list_2) identifying MVS1 as the primary routing communication protocol stack, DVB 1 as a dynamic routable VIPA with port 60 as an associated port and all of the communication protocol stacks 22, 26 30, 34 and 38 as candidate target communication protocol stacks. Also, the communication protocol stack 22 would be identified as a backup to the communication protocol stack 38 and the communication protocol stack 38 would be identified as a backup to the communication protocol stack 22. The communication protocol stack 22 would retain the information in the distributed VIPA list for DVB2 as the communication protocol stack 22 does not have a VIPADISTribute statement for DVB2. However, the communication protocol stack 38 need not retain the received VIPA list for DVA1 as it has its own, explicit, VIPADISTribute statement for DVA 1.

When, for example, communication protocol stack 26 receives DVIPA_list_1, it examines the list and determines that it is identified as a candidate target stack. Thus, the VIPA distribution function 23 of communication protocol stack 26 adds the DVIPA DVA1 as a non-routable VIPA and determines if an application is executing which is bound to DVA 1 and listening to port 60. For purposes of the present example, APP A is bound to DVA1 and listening to port 60 so the communication protocol stack 26 sends a SRVSTAT message to communication protocol stack 22 identifying itself as a current actual target. The VIPA distribution function 23 of the communication protocol stack 22 incorporates the XCF address of the communication protocol stack 22 into its DPT. Messages to port 60 of the DVIPA may then be routed to the communication protocol stack 26. Because no connections exist at this time, a NEWCONN message is not sent.

When the communication protocol stack 30 receives DVIPA_list_1, it examines the list and is not identified as a candidate target stack or as a backup to the communication protocol stack 22 and may disregard the list. When the communication protocol stack 38 receives DVIPA_list_1, it examines the list and is not identified as a candidate target stack but is identified as a backup to the communication protocol stack 22. Thus, the communication protocol stack 38 stores the list for use in error recovery.

When any of the communication protocol stacks 22, 26, 30, 34 and 38 receive the DVIPA_list 2 they note that the "ALL" parameter is identified and add the DVIPA DVB 1 as a non-routable VIPA. These communication protocol stacks 22, 26, 30, 34 and 38 monitor for applications bound to DVB 1 and listening on port 60 to determine if an application is executing which is bound to DVB 1 and listening to port 60. If and when such an application binds to DVB 1 and listens on port 60 a SRVSTAT message is sent to the communication protocol stack 38 to identify the candidate target stack as a current actual target as described above. Furthermore, if a communication protocol stack is subsequently activated, it identifies DVB 1 as a DVIPA and adds DVB 1 as a non-routable VIPA.

Furthermore, in the present example, DVA1 has a connection established to APPA on MVS2 which is using IPSec. When a current actual target communication protocol stack, such as protocol stack 26, receives a GRE encapsulated message from routing protocol stack 22, it GRE decapsulates the message and determines if the message is for the IPSec connection to DVA1 by consulting its CRT. The current actual target communication protocol stack 26 also evaluates the physical link over which the message was received to determine if it corresponds to the XCF address of the routing communication protocol stack 22 which was incorporated in the GRE header of the message. If the physical link and the XCF address correspond, then the message is accepted. Otherwise, the message is rejected. Furthermore, because the message is for DVA1, IP filtering of the inbound message is bypassed. The message is provided to APPA.

For an outbound message, the server protocol stack operates as described above with reference to FIG. 6. The server protocol stack determines if the outbound message is to a DVIPA and, if so, the message is encapsulated with GRE and sent to the routing protocol stack for IPSec processing.

Figure 12:
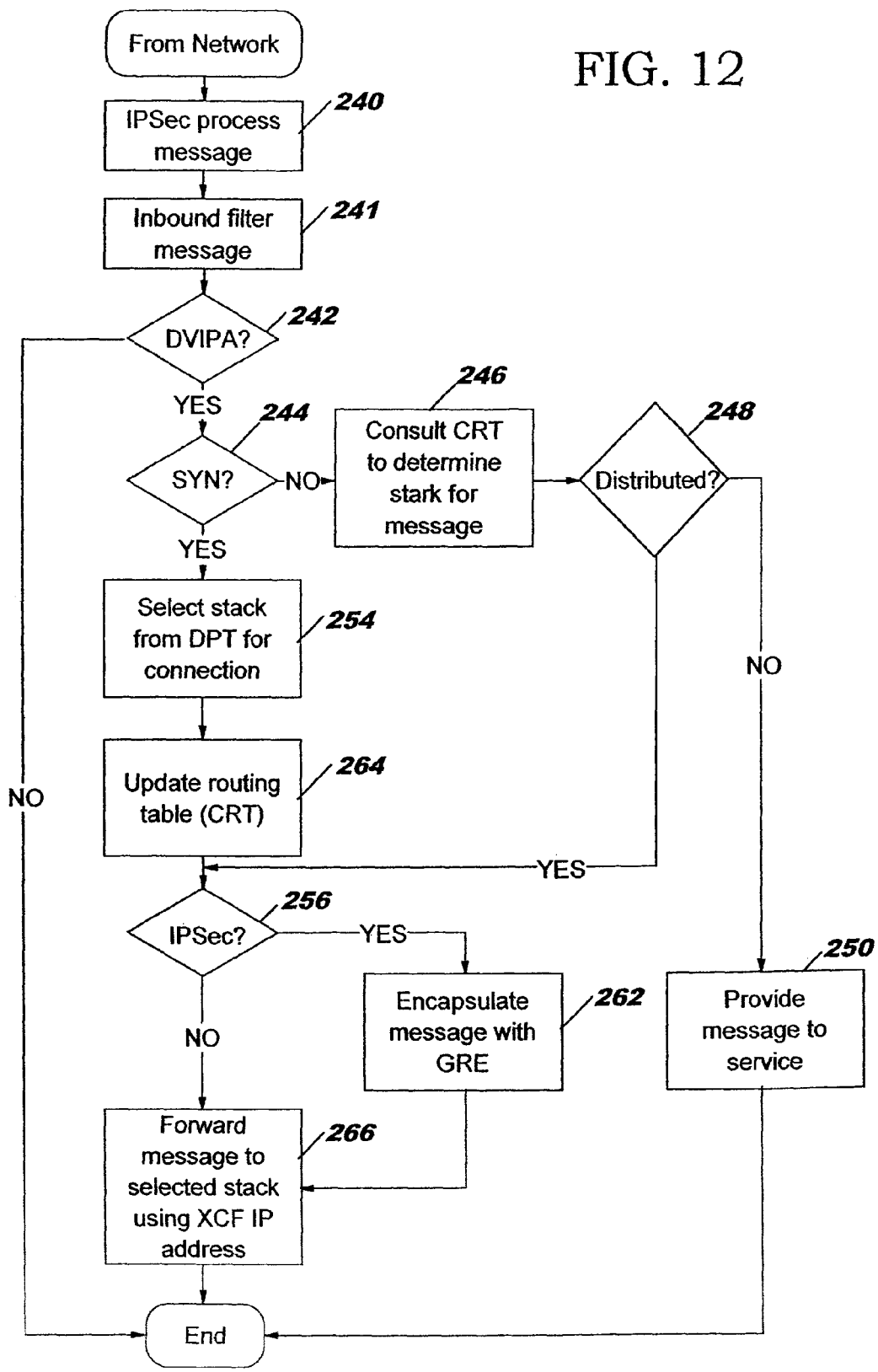
FIG. 12 is a flowchart illustrating operations for a incoming communications from the network to the routing protocol stack according to embodiments of the present invention.

FIG. 12 illustrates operations of a routing communication protocol stack when a communication is received from the network 44. As is seen in FIG. 12, the communication is IPSec processed (block 240) and inbound filtered utilizing the IP/IPSec filters for network communications (block 241). The communication protocol stack determines if the communication is to a DVIPA associated with the stack (block 242) by, for example, examining the IP address and port of the communication and comparing that with those of the DVIPAs for the protocol stack (block 242). If the communication is not to a DVIPA of the protocol stack, then operations of the VIPA distribution function 23 may terminate with respect to the communication.

If the communication is to a DVIPA of the protocol stack, then the VIPA distribution function 23 determines if the communication is a SYN to establish a connection to the DVIPA (block 244). If so, then the VIPA distribution function 23 may select a current actual target for the connection (i.e. a communication protocol stack with an application bound to the DVIPA and listening to the port specified by the communication) (block 2). Such a selection may, for example, be based on predefined criteria, utilizing a predefined selection pattern, such as round-robin, weighted round-robin or the like, or may be based on dynamic criteria, policies or combinations thereof. For example, the selection may be made to distribute workload between the candidate target stacks. Thus, a workload manger and/or a service policy agent may be consulted in selecting the candidate target stack.

However the selection is made, the VIPA distribution function 23 updates a current routing table (CRT) which defines the path from the routing communication protocol stack to the selected current actual target (block 264). Such an update may take the form of creating an entry incorporating the source IP address, DVIPA and port and the XCF address of the selected current actual target.

The routing communication protocol stack also determines if IPSec processing was performed on the message (block 256). If the connection utilizes IPSec (block 256) the message is GRE encapsulated (block 262). In either case, the message is forwarded to the selected current actual target using the XCF address of the current actual target (block 266).

Returning to block 244, if the communication is not a SYN message, then the VIPA distribution function 23 of the routing communication protocol stack consults the CRT to route the communication (block 246). It is also determined if the message is distributed (i.e. for a current actual target which is remote from the routing communication protocol stack) (block 248). If the message is not distributed (block 248), the message is for a local target and may be provided to the associated service (block 250). If the message is distributed (block 248), then operations continue with block 256 as described above.

Figure 13:
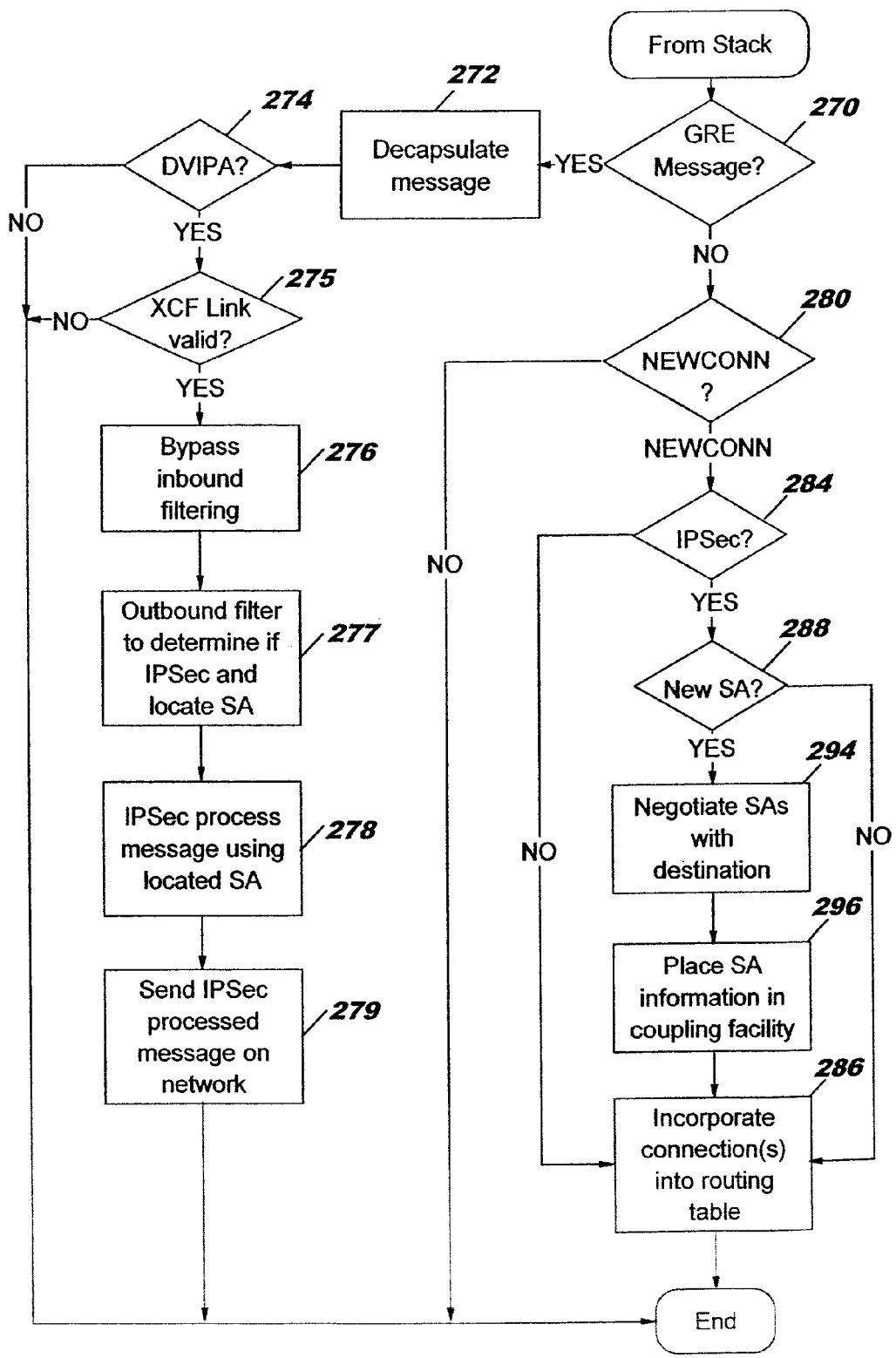
FIG. 13 is a flowchart illustrating operations of a routing protocol stack receiving communications from another protocol stack according to embodiments of the present invention.

FIG. 13 illustrates operations of the VIPA distribution function 23 of the routing communication protocol stack when a message is received from another communication protocol stack. As is seen in FIG. 13, the VIPA distribution function 23 determines if the message is a GRE encapsulated message (block 270). If so, the message is GRE decapsulated (block 272). It is determined if the GRE decapsulated message is for a DVIPA (block 274). If not, operations with respect to the IPSec processing may terminate. If the message is for a DVIPA (block 274), it is determined if the message was received from an XCF link associated with the source of the message (block 275). Such a determination may be made, as described above, by comparing the physical link over which the message was received with the XCF source address in the GRE header to see if the physical link corresponds to the XCF address. If not, the message is discarded.

If the message is from the proper physical link, inbound filtering for the message is bypassed (block 276) and the GRE decapsulated message is outbound filtered to determine if IPSec processing is needed (block 277). If so, the GRE decapsulated message is IPSec processed by the routing communication protocol stack (block 278). The IPSec processed message is then sent on the network (block 278).

If the message is not a GRE encapsulated message (block 270), it may be determined if the message is a NEWCONN message (block 280). A NEWCONN message may be generated if an application bound to a DVIPA utilizing a port in the VIPA list initiates a connection or, as described above, if a communication protocol stack receives a VIPA list with a DVIPA which already has applications using the DVIPA for connections, then the VIPA distribution function 23 of the communication protocol stack sends a NEWCONN message to the routing communication protocol stack to notify the routing communication protocol stack of the connection. If the message is a NEWCONN message (block 280), the VIPA distribution function 23 determines if the connection is to utilize IPSec (block 284). If not, the VIPA distribution function 23 incorporates the connection into the CRT (block 286). Such an incorporation of the connection into the CRT may be carried out as described above for connections originated from network 44.

If the message is a NEWCONN message associated with a connection using IPSec, then it is determined if a new SA is required for the connection (block 288). Such a determination may be made, for example, based on whether the NEWCONN is for a takeback of for a connection which is requesting that an SA be negotiated. If a new SA is not needed (block 288), the new connection is incorporated in the CRT as described above (block 286).

If a new SA is needed (block 288), IKE is notified and a new SA is negotiated (block 294). The phase 1 and phase SA information and information correlating the two is placed in the coupling facility for the new SA (block 296). The new connection is also incorporated in the CRT as described above (block 286). Furthermore, binding information for the connection may be included in the CRT which may allow the routing communication protocol stack to perform policy filter rule binding. The use of policy filter rule binding allows the routing communication protocol stack to avoid per packet filter rule search by identifying the filter rules associated with a connection in the CRT and then using those filter rules for all packets of the connection.

Returning to the example illustrated in FIG. 9, when an IPSec encapsulated SYN message to port 60 of DVA1 is received from network 44 by communication protocol stack 22, the VIPA distribution function 23 IPSec decapsulates the SYN message and determines that the SYN is to a dynamic routable VIPA for which it is the routing communication protocol stack, consults its DPT and optionally a workload management function (not shown) and selects a current actual target as a destination for the message. In the present example, IPSec is specified for the connection. The VIPA distribution function 23 of the communication protocol stack 22 may select the communication protocol stack 26 as a destination. The communication protocol stack 22 creates an entry for the connection in its CRT. The SYN message is encapsulated into a GRE encapsulated message and forwarded to the communication protocol stack 26. Subsequent IPSec encapsulated messages from the network 44 to port 60 of DVA1 from the source IP address will also be IPSec processed, encapsulated and routed to the communication protocol stack 26 using the CRT entry.

An instance of APP A of the communication protocol stack 26 bound to DVA1 and utilizing port 60 may also establish a connection over network 44 which, if utilizing IPSec, will be routed through the communication protocol stack 22 as the routing communication protocol stack. When such occurs, the VIPA distribution function 23 of communication protocol stack 26 sends a NEWCONN message to the routing communication protocol stack 22 identifying the new connection. The VIPA distribution function 23 of communication protocol stack 22 receives the NEWCONN message and, if a new SA is needed for the connection, notifies IKE and negotiates the SAs for the connection. Information regarding the new SAs is placed in the coupling facility and the CRT is updated to reflect the new DVIPA connection to route communications from the identified new connection to port 60 of DVA1 to the communication protocol stack 26.

Figure 14:
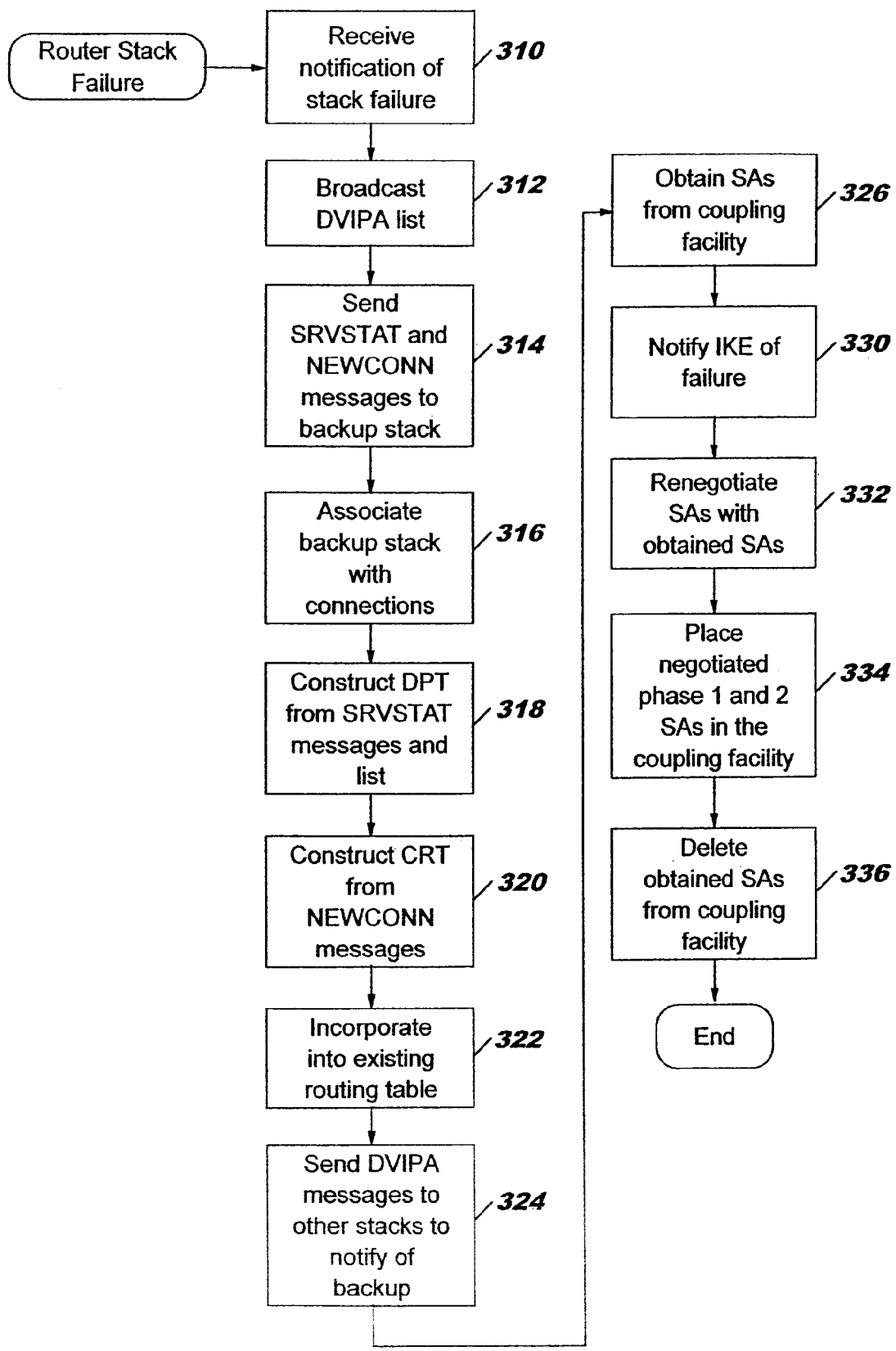
FIG. 14 is a flowchart illustrating operations of protocol stacks during failure of a routing protocol stack according to embodiments of the present invention.
Figure 15:
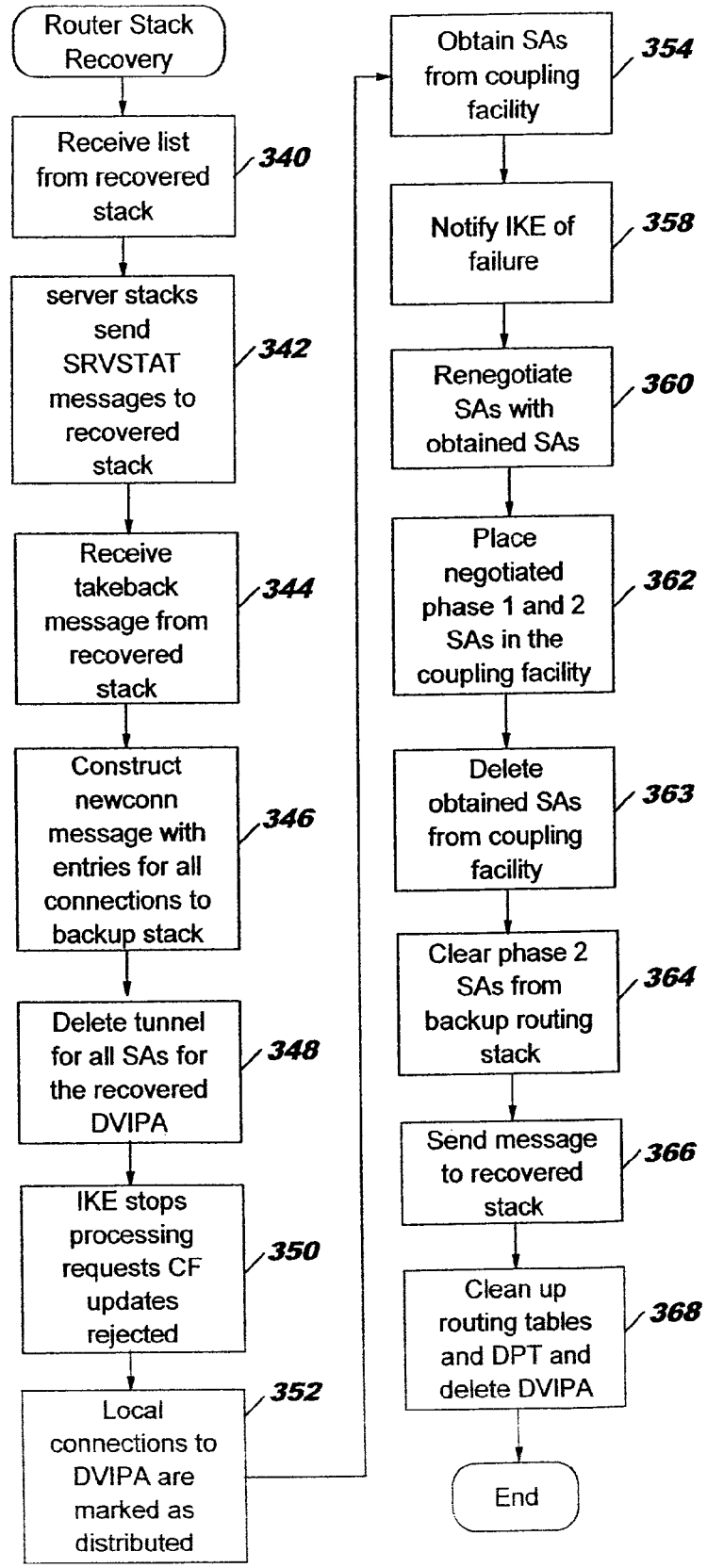
FIG. 15 is a flowchart illustrating operations of protocol stacks for recovery of a failed routing protocol stack according to embodiments of the present invention.

FIGS. 14 and 15 illustrate operations of the VIPA distribution function 23 during failure of a routing communication protocol stack having DVIPAs using IPSec and during recovery of a routing communication protocol stack. As seen in FIG. 14, when a failure occurs, the other communication protocol stacks in the cluster of data processing systems are notified of the failure (block 310). The communication protocol stack identified as the backup stack for the dynamic routable VIPA takes over routing functions for that DVIPA so as to become a backup routing communication protocol stack. In addition, the backup routing communication protocol stack may broadcast the DVIPA list that it will utilize in routing connections for the DVIPA (block 312). This list may be the list provided by the primary routing communication protocol stack or a list defined explicitly for the backup routing communication protocol stack. Alternatively, the list may be distributed only in the instance where the backup routing communication protocol stack has an explicitly defined DVIPA list.

As described above, because of the broadcast of this information, each of the communication protocol stacks is aware that it is a candidate target for a DVIPA and the identity of the highest ranking backup routing communication protocol stack. Therefore, the communication protocol stacks with application instances bound to the DVIPA and listening on an associated port may send a SRVSTAT message and a NEWCONN message(s) for connections to the DVIPA for the communication protocol stack to the backup routing communication protocol stack (block 314). The communication protocol stacks also associate the backup routing communication protocol stack with any connections utilizing the DVIPA so that subsequent messages for the DVIPA are sent to the backup routing communication protocol stack (block 316). The backup routing communication protocol stack utilizes the SRVSTAT messages and its information from the appropriate VIPA list to build a new DPT for the DVIPA (block 318).

The backup routing communication protocol stack also receives NEWCONN messages from the server communication protocol stacks with existing DVIPA connections and constructs a CRT based on these messages (block 320). The constructed CRT may include information on whether the connection utilized IPSec. The routing information from the constructed CRT is incorporated into the backup routing communication protocol stack's own CRT (block 322). The backup routing communication protocol stack may also send its own DVIPA messages to the other communication protocol stacks to notify the other communication protocol stacks that it is performing the backup function (block 324). Such messages may be sent to prevent other backup communication protocol stacks in a list of backups from taking over the DVIPA. Details on the transfer of a VIPA to a backup are provided in U.S. patent application Ser. No. 09/401,419 described above. Furthermore, in particular embodiments, the issuance of the SRVSTAT or the NEWCONN messages may be in response to the DVIPA messages sent by the backup routing communication protocol stack. Thus, embodiments of the present invention are not limited to the sequence illustrated in FIGS. 14 and 15.

The backup routing communication protocol stack obtains the SA information from the coupling facility (block 326). IKE is notified of the failure (block 330) and the obtained SA information is provided to IKE which then renegotiates the Phase 1 and Phase SAs based on the information and installs the negotiated SAs in the communication protocol stack (block 332). The newly negotiated phase 1 SAs and correlation to phase SAs are then placed in the coupling facility as described above to provide the recovery information for the IPSec SAs (block 334). The information read from the coupling may be removed (block 336). Operations continue with the backup routing communication protocol stack operating as the routing communication protocol stack described above.

Turning to FIG. 15, when the primary communication protocol stack recovers, it again broadcasts its VIPA list which is received by the other communication protocol stacks (block 340). In response to receiving the VIPA list, the candidate target stacks send SRVSTAT messages to the recovered primary routing communication protocol stack (block 342) which identify the stacks which have application instances bound to the DVIPA and utilizing a port of the VIPA list. The recovered primary routing communication protocol stack also sends a DVIPA message to the backup communication protocol stack which receives the takeback message (block 344) and generates a NEWCONN message for all the connections which are routed through the backup communication protocol stack (block 346).

The backup stack also performs a delete tunnel for all SAs of the DVIPA that is being recovered and schedules a delete DVIPA event to IKE (block 348). IKE cleans up its representation of the Phase 1 associated with the tunnel being deleted and no longer processes Phase 1 Phase 2 requests and updates to the coupling facility are rejected so that the coupling facility entries are considered stable (block 350). Also, local connections to the DVIPA at the backup routing communication protocol stack are marked as distributed so that they are routed through the recovering routing communication protocol stack (block 352).

The recovering routing communication protocol stack obtains the SA information from the coupling facility (block 354) and removes the information from the coupling facility after it is obtained (block 356). IKE is notified of the takeback (block 358), for example, using an Event Control Block (ECB) and the obtained SA information provided to IKE which renegotiates the Phase 1 and Phase SAs based on the information and installs the negotiated SAs in the communication protocol stack (block 360). The newly negotiated phase 1 SAs and correlation to phase SAs are then placed in the coupling facility as described above to provide the recovery information for the IPSec SAs (block 362) and the obtained SAs may be removed from the coupling facility (block 363). The phase SAs may then be cleared from the backup routing communication protocol stack and a delete may be sent to the IKE partner for the Phase SAs that were active on the backup routing communication protocol stack prior to takeover by the primary routing communication protocol stack (block 364). To perform such a delete, the Security Parameter Index (SPI) and the protocol for the Phase SA should be included as part of the recovery information stored in the coupling facility. Furthermore, IKE may also install filters in the communication protocol stack. In such a case, added dynamic filters that are duplicates of active dynamic filters may be discarded. New SAs and dynamic filters that can be associated with an existing dynamic filter and tunnel may be added to the existing tunnel.

The NEWCONN message is sent to the primary routing communication protocol stack (block 366) and the primary routing communication protocol stack constructs a CRT based on the information from the message. Alternatively, the server stacks may send NEWCONN messages directly to the recovered primary routing stack either in response to receiving the VIPA list or the DVIPA message. In any case, routing of the existing connections may then be performed by the primary routing communication protocol stack. Finally, the backup routing communication protocol stack deletes the DVIPA and cleans up its routing and DPT tables (block 368). Thus, the routing of the DVIPA is returned to the recovered stack.

In the example illustrated in FIG. 9, assume that the communication protocol stacks 26 and 34 have applications with connections using IPSec routed through the DVIPA of the routing communication protocol stack 22. Furthermore, the communication protocol stack 38 is defined as the backup to the communication protocol stack 22. If the communication protocol stack 22 fails, then the communication protocol stacks 26 and 34 send SRVSTAT messages to the backup routing communication protocol stack 38 identifying them as current actual targets. The communication protocol stacks 26 and 34 also associate the communication protocol stack 38 with the DVIPA DVA1 and send all subsequent messages to the backup routing communication protocol stack 38. The communication protocol stack 38 builds its DPT from the SRVSTAT messages, receives NEWCONN messages for connections through the failed communication protocol stack 22 and creates routing information for incorporating in its CRT.

The backup routing communication protocol stack 38 also obtains the SA information from the coupling facility and notifies its instance of IKE through an ECB to negotiate the SAs using the information from the coupling facility 40. IKE negotiates the SAs and installs the SAs in the backup routing communication protocol stack 38 which places the SA information into the coupling facility 40. The backup routing communication protocol stack 38 incorporates the routing information into its routing table and begins routing messages and performing IPSec processing for the connections previously routed through the failed communication protocol stack. The backup routing communication protocol stack 38 may also send a DVIPA message to the other communication protocol stacks 26, 30 and 34 to indicate that it is backing up the DVIPA DVA 1.

When the primary routing communication protocol stack 22 is recovered, it sends a VIPA list to the other communication protocol stacks 26, 30, 34 and 38. The VIPA list message signals the other communication protocol stacks 26, 30, 34 and 38 to send SRVSTAT messages to the communication protocol stack 22 so as to identify current actual targets for the DVIPA DVA1. The other communication protocol stacks also route subsequent IPSec traffic through communication protocol stack 22. The communication protocol stack 22 builds a DPT from the SRVSTAT messages. The backup routing communication protocol stack 38 also generates a NEWCONN message for each connection to DVA1 routed through the backup routing communication protocol stack 38 and sends this message to the communication protocol stack 22. Alternatively, the server communication stacks may send NEWCONN messages in response to the VIPA list identifying existing connections to the DVIPA. In any case, the communication protocol stack 22 builds a CRT from the NEWCONN message(s).

The backup routing communication protocol stack 38 deletes the SAs for the connections using IPSec and schedules a delete DVIPA event which notifies its instance of IKE that the SAs are no longer owned by the backup routing communication protocol stack's 38 IKE instance and so IKE no longer negotiates SAs and updates to the coupling facility are no longer performed. The backup routing communication protocol stack 38 also cleans up its routing tables and deletes DVA1 so that it no longer performs routing for DVA1 and identifies any local connections to DVA1 as distributed so that subsequent IPSec traffic to DVA1 is routed through communication protocol stack 22.

The communication protocol stack 22 reads the SA information from the coupling facility 40 and notifies its IKE instance of the takeback. IKE negotiates new SAs based on the information from the coupling facility 40 and installs the new SAs in the communication protocol stack 22 which places SA information in the coupling facility 40 and clears the previously read information from the coupling facility 40. Thus, control of DVA1 may be transferred back to the communication protocol stack 22 with limited disruption to the connections.

In the VIPA Distributor embodiments providing failure recovery, the SA negotiated that applies to a dynamic VIPA is preferably at a granularity no coarser than host for the local address. In other words, a dynamic SA should not use a subnet or range the encompasses a dynamic VIPA address. This rule may ensure that, on a VIPA giveback, the SA can be moved from host to host without concerns about an SA being applicable to both the backup and primary host simultaneously. If such a condition exists, the SA can be identified as not moveable within the Sysplex and, thus, not a "Sysplex Wide SA."

Furthermore, to provide such movability of SAs, certificates identifying hosts should be available on all hosts. Thus, Resource Access Control Facility (RACF), the repository for IKE certificates should be shareable between processors in the Sysplex.

While the present invention has been described with respect to the VIPA distribution function as a part of the communication protocol stack, as will be appreciated by those of skill in the art, such functions may be provided as separate functions, objects or applications which may cooperate with the communication protocol stacks. Furthermore, the present invention has been described with reference to particular sequences of operations. However, as will be appreciated by those of skill in the art, other sequences may be utilized while still benefitting from the teachings of the present invention. Thus, while the present invention is described with respect to a particular division of functions or sequences of events, such divisions or sequences are merely illustrative of particular embodiments of the present invention and the present invention should not be construed as limited to such embodiments.

Furthermore, while the present invention has been described with reference to particular embodiments of the present invention in a System/390 environment, as will be appreciated by those of skill in the art, the present invention may be embodied in other environments and should not be construed as limited to System/390 but may be incorporated into other systems, such as a Unix or other environments, by associating applications or groups of applications with an address rather than a communications adapter. Thus, the present invention may be suitable for use in any collection of data processing systems which allow sufficient communication to all of the systems for the use of dynamic virtual addressing. Accordingly, specific references to System/390 systems or facilities, such as the "coupling facility," "ESCON," "Sysplex" or the like should not be construed as limiting the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A secure network communications system in a distributed workload environment having target hosts which are accessed through a distribution processor by a common network address, comprising:

a computer memory configured to store program instructions;

means for receiving at the distribution processor, network communications directed to the common network address;

a processor configured to execute the program instructions in order to create:

means for determining whether the network communications are secure network communications;

means for processing secure network communications having:

means for routing both inbound and outbound communications with target hosts which are associated with an end-to-end secure network communication through the distribution processor;

means for processing both inbound and outbound end-to-end secure network communications at the distribution processor so as to provide endpoint network security processing of communications from the target host to the distribution processor and endpoint network security processing of communications from the distribution processor to the target host such that the distribution processor serves as an endpoint for the end-to-end secure network communication; and means for distributing the received secure network communications that are directed to the common network address among selected ones of the target hosts so as to distribute workload associated with the network communications among the target hosts including means for encapsulating communications between the distribution processor and the selected ones of the plurality of target hosts which are associated with end-to-end secure network communications so as to distinguish communications between the distribution processor and the selected ones of the plurality of target hosts which are associated with secure network communications from other communications; and means for processing non-secure communications by distributing the received network communications that are directed to the common network address among the target hosts so as to distribute workload associated with the network communications among the target hosts.

2. The system according to claim 1, further comprising:
means for determining if the received network communications are end-to-end secure network communications which are to be distributed to ones of the target hosts;
wherein the means for encapsulating communications between the distribution processor and selected ones of the plurality of target hosts which are associated with end-to-end secure network communications comprises a means for processing the received network communications so as to provide encapsulated generic communications to the ones of the plurality of target hosts if the received network communications are end-to-end secure network communications which are distributed to ones of the target hosts and means to not provide encapsulated generic communications to the ones of the plurality of target hosts if the received network communications are not end-to-end secure network communications.

3. The system according to claim 1, wherein the means for encapsulating communications between the distribution processor and selected ones of the plurality of target hosts which are associated with end-to-end secure network communications comprises means to encapsulate the communications in a generic routing format.

4. The system according to claim 3, wherein generic communications are encapsulated in a generic routing format having sufficient information in a header of the generic routing format so as to authenticate the source of the communication between the distributing processor and ones of the plurality of target hosts.

5. The system according to claim 3, further comprising means for establishing common IP filters for communications at the distributing processor and the plurality of target hosts.

6. The system according to claim 5, wherein the common IP filters bypass IP filtering for inbound communications encapsulated in the generic routing format.

7. The system according to claim 1, wherein the communications received from the target hosts at the distribution processor and the encapsulated communications to ones of the plurality of target hosts from the distribution processor are communicated over trusted communication links 8. The system according to claim 1, further comprising:
means for receiving at a target host, an encapsulated communication;
means for comparing a physical link corresponding to said distributor to a source of encapsulation; and
means for ignoring the encapsulated communication if said physical link does not match to said source of encapsulation.

9. The system according to claim 1, wherein the means for distributing the received network communications that are directed to the common network address among selected ones of the target hosts distribution processor comprises distributing the received network communications using a sysplex distributor.

10. The system according to claim 1, wherein the end-to-end secure network communication comprises a communication using the IPSEC communication protocol.

* * * * *